(12) United States Patent
Oh et al.

(10) Patent No.: US 10,802,782 B2
(45) Date of Patent: Oct. 13, 2020

(54) ELECTRONIC DEVICE HAVING BENDED DISPLAY AND CONTROL METHOD THEREOF

(71) Applicant: Samsung Electronics Co., Ltd, Gyeonggi-do (KR)

(72) Inventors: Saeah Oh, Seoul (KR); Suhyun Kim, Gyeonggi-do (KR); Boram Namgoong, Gyeonggi-do (KR); Hayoul Jung, Gyeonggi-do (KR); Jamin Goo, Gyeonggi-do (KR); Kiwon Kim, Gyeonggi-do (KR); Eunyoung Kim, Seoul (KR); Sangil Park, Seoul (KR); Jeheon Park, Gyeonggi-do (KR); Jin Sagong, Gyeonggi-do (KR); Seonghoon You, Gyeonggi-do (KR); Dongkyu Lee, Seoul (KR); Youngha Cho, Seoul (KR); Jinchul Choi, Gyeonggi-do (KR); Junghee Yeo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 15/331,848

(22) Filed: Oct. 22, 2016

(65) Prior Publication Data

US 2017/0115944 A1 Apr. 27, 2017

(30) Foreign Application Priority Data

Oct. 22, 2015 (KR) .................. 10-2015-0147271

(51) Int. Cl.
*G06F 3/048* (2013.01)
*G06F 3/14* (2006.01)
(Continued)

(52) U.S. Cl.
CPC .......... *G06F 3/1423* (2013.01); *G06F 1/1626* (2013.01); *G06F 1/1647* (2013.01);
(Continued)

(58) Field of Classification Search
CPC ................. G06F 1/1652; G06F 1/1694; G06F 2200/1637; G06F 3/0346; G06F 3/04845;
(Continued)

(56) References Cited

U.S. PATENT DOCUMENTS

2009/0278806 A1  11/2009  Duarte et al.
2010/0048194 A1*  2/2010  Park ..................... G06F 1/1626
                                                                  455/418
(Continued)

FOREIGN PATENT DOCUMENTS

| KR | 101515620 B1 | 5/2015 |
| WO | 2009137419 A2 | 11/2009 |
| WO | 2014175513 A1 | 10/2014 |

OTHER PUBLICATIONS

Foreign Communication From a Related Counterpart Application, PCT Application No. PCT/KR2016/011901, International Search Report dated Jan. 25, 2017, 5 pages.

(Continued)

*Primary Examiner* — Renee D Chavez
*Assistant Examiner* — Jianmei F Duckworth

(57) ABSTRACT

According to various embodiments, an electronic device may comprise a bended display, a sensor unit, and a processor. The bended display includes a front display region, a side display region, and a back display region, which respectively correspond to a front face, a side face, and a back face of the electronic device. The sensor unit detects a motion of the electronic device. If an event occurs while content is displayed on the front display region, the processor controls the bended display to display a graphic object (Continued)

corresponding to the event on the front display region, and also controls the bended display to display a first screen corresponding to the graphic object on the back display region, based on the detected motion of the electronic device.

20 Claims, 17 Drawing Sheets

(51) Int. Cl.
  *G06F 3/0482*    (2013.01)
  *G06F 3/0488*    (2013.01)
  *G06F 3/0481*    (2013.01)
  *G06F 1/16*    (2006.01)
  *G06F 3/0486*    (2013.01)
  *G06F 1/3234*    (2019.01)
  *H04M 1/02*    (2006.01)
  *G06F 3/0346*    (2013.01)
  *G06F 3/0484*    (2013.01)
  *H04M 1/725*    (2006.01)

(52) U.S. Cl.
  CPC .......... *G06F 1/1652* (2013.01); *G06F 1/1694* (2013.01); *G06F 1/3265* (2013.01); *G06F 3/0346* (2013.01); *G06F 3/0482* (2013.01); *G06F 3/0486* (2013.01); *G06F 3/04817* (2013.01); *G06F 3/04845* (2013.01); *G06F 3/04883* (2013.01); *G06F 3/04886* (2013.01); *H04M 1/0266* (2013.01); *G06F 2200/1637* (2013.01); *G06F 2203/0339* (2013.01); *G06F 2203/04102* (2013.01); *H04M 1/72519* (2013.01); *Y02D 10/153* (2018.01)

(58) Field of Classification Search
  CPC .... G06F 3/0486; G06F 3/1423; G06F 1/1626; G06F 1/1647; G06F 1/3265; G06F 3/04817; G06F 3/0482; G06F 3/04883; G06F 3/04886; H04M 1/0266
  USPC .......................................................... 715/761
  See application file for complete search history.

(56) References Cited

U.S. PATENT DOCUMENTS

| | | | |
|---|---|---|---|
| 2010/0283860 A1* | 11/2010 | Nader | G06F 1/1626 348/222.1 |
| 2011/0128241 A1* | 6/2011 | Kang | G06F 1/1643 345/173 |
| 2014/0035794 A1 | 2/2014 | Chen | |
| 2014/0229888 A1* | 8/2014 | Ko | G06F 3/04886 715/783 |
| 2014/0320435 A1* | 10/2014 | Modarres | G06F 3/0412 345/173 |
| 2014/0342782 A1 | 11/2014 | Karmanenko et al. | |
| 2014/0370938 A1 | 12/2014 | Lee et al. | |
| 2015/0015511 A1 | 1/2015 | Kwak et al. | |
| 2015/0015512 A1* | 1/2015 | Kwak | G06F 3/0412 345/173 |
| 2015/0031417 A1 | 1/2015 | Lee et al. | |
| 2015/0199125 A1 | 7/2015 | Tsukamoto et al. | |
| 2016/0041680 A1* | 2/2016 | Chi | H04B 1/385 345/173 |

OTHER PUBLICATIONS

Foreign Communication From a Related Counterpart Application, European Application No. 16195172.8-1879, Extended European Search Report dated Mar. 2, 2017, 9 pages.

* cited by examiner

ELECTRONIC DEVICE HAVING BENDED DISPLAY AND CONTROL METHOD THEREOF

CROSS-REFERENCE TO RELATED APPLICATION(S) AND CLAIM OF PRIORITY

The present application is related to and claims the benefit under 35 U.S.C. § 119(a) of a Korean patent application filed on Oct. 22, 2015, in the Korean Intellectual Property Office and assigned Serial No. 10-2015-0147271, the entire disclosure of which is hereby incorporated by reference.

TECHNICAL FIELD

The present disclosure relates to an electronic device having a bended display and a control method thereof. In particular, the present disclosure relates to a method for controlling a display operation for content on the bended display that covers front, side and back display regions.

BACKGROUND

With a remarkable growth of digital technologies, a great variety of mobile electronic devices such as smart phones or tablet personal computers that allow users to use communication and personal information processing, even while moving, are increasingly popularized in recent days. These mobile devices today outgrow their respective traditional fields and hence reach a mobile convergence stage in which the fields of other type devices are incorporated. For example, a mobile device has ability to support various functions such as a voice call, a video call, a short message service (SMS), a multimedia message service (MMS), an email, an electronic organizer, a digital camera, a broadcasting receiver, a music player, a video player, an internet access, a messenger, a social network service (SNS), and the like.

When this mobile device receives a notification while performing a certain task, a user may check details of the received notification by dragging downward a notification panel disposed at an upper portion of a screen or changing a currently displayed screen to a new screen associated with the notification. Thus, a user interaction is required for interrupting the task being currently performed, and then invoking one or more depth user interfaces (UIs).

Meanwhile, a bended display, also referred to as a wrap around display, covers the front, side and back of an electronic device and thereby can display content (or objects) on front, side, and back display regions. For example, the bended display can display a received notification on the back display region while performing a current task on the front display region. In other words, this realizes a zero-depth UI.

Nevertheless, the bended display may unnecessarily consume electric power when content (or objects) are displayed on a region at which a user does not look.

SUMMARY

To address the above-discussed deficiencies, it is a primary object to provide an electronic device according to various embodiments of the present disclosure. For example, in order to reduce power consumption, the present disclosure proposes a new display concept, based on a user's context, for the bended display. Additionally, when an application having a hierarchical display structure is executed, the bended display may display each of upper-layer and lower-layer screens selectively on the front or back display region.

In an embodiment, the display structure may comprise a bended display including a front display region, a side display region, and a back display region, which respectively correspond to a front face, a side face, and a back face of the electronic device. The display may also include a sensor unit configured to detect a motion of the electronic device and a processor configured to, if an event occurs while content is displayed on the front display region, control the bended display to display a graphic object corresponding to the event on the front display region; and control the bended display to display a first screen corresponding to the graphic object on the back display region, based on the detected motion of the electronic device.

In an embodiment, the processor may be further configured to control the bended display to display a second screen corresponding to the graphic object on the side display region. Part of the content displayed on the first screen may be displayed on the second screen.

In an embodiment, the sensor unit may include an acceleration sensor, and the processor may be further configured to control the bended display to gradually display the first screen on the back display region, based on a signal outputted from the acceleration sensor.

In an embodiment, the processor may be further configured to control the bended display to display an icon for executing an application on the side display region, to receive a user input on the side display region, and to control the bended display to display an execution screen of the application on the front display region or on the back display region.

In an embodiment, the processor may be further configured to control the bended display to display the execution screen of the application on the front display region when the user input is a leftward drag of the icon.

In an embodiment, the processor may be further configured to control the bended display to display the execution screen of the application on the back display region when the user input is a rightward drag of the icon.

In an embodiment, the processor may be further configured to, if a tap gesture is detected on the side display region when a list is displayed on the front display region, select an item corresponding to a location of the detected tap gesture, and to control the bended display to display the selected item to be visually distinguished.

In an embodiment, the processor may be further configured to control the bended display to drag the selected item when a drag gesture is detected on the side display region.

In an embodiment, the processor may be further configured to receive a user input of selecting one item in a list when the list is displayed on the front display region, to control the bended display to display a thumbnail image of the selected item on the side display region, and to control the bended display to display a detailed screen corresponding to the selected item on the back display region.

In an embodiment, the display method of an electronic device which includes a bended display including a front display region, a side display region, and a back display region, which respectively correspond to a front face, a side face, and a back face of the electronic device may comprise steps of: displaying content on the front display region; if an event occurs while the content is displayed on the front display region, displaying a graphic object corresponding to the event on the front display region; detecting a motion of the electronic device through a sensor unit; and displaying a first screen corresponding to the graphic object on the back display region, based on the detected motion of the electronic device.

In an embodiment, the method may further comprise step of displaying a second screen corresponding to the graphic object on the side display region. In another embodiment, a part of the content displayed on the first screen may be displayed on the second screen.

In an embodiment, the method may further comprise step of gradually displaying the first screen on the back display region, based on a signal outputted from an acceleration sensor of the sensor unit.

In an embodiment, the method may further comprise steps of displaying an icon for executing an application on the side display region; receiving a user input on the side display region; and displaying an execution screen of the application on the front display region or on the back display region.

In an embodiment, the step of displaying the execution screen of the application may include displaying the execution screen of the application on the front display region when the user input is a leftward drag of the icon.

In an embodiment, the step of displaying the execution screen of the application may include displaying the execution screen of the application on the back display region when the user input is a rightward drag of the icon.

In an embodiment, the method may further comprise steps of detecting a tap gesture on the side display region when a list is displayed on the front display region; selecting an item corresponding to a location of the detected tap gesture; and displaying the selected item to be visually distinguished.

In an embodiment, the method may further comprise steps of detecting a drag gesture on the side display region; and dragging the selected item in response to the detected drag gesture.

In an embodiment, the method may further comprise steps of displaying a list on the front display region; receiving a user input of selecting one item in the list when the list is displayed; displaying a thumbnail image of the selected item on the side display region in response to the user input; and displaying a detailed screen corresponding to the selected item on the back display region.

According to various embodiments of this disclosure, the bended display includes the front, side and back display regions and, based on user's context, displays content on the front, side or back display region. Therefore, it is possible to provide seamless information to a user and to realize a zero-depth UI.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
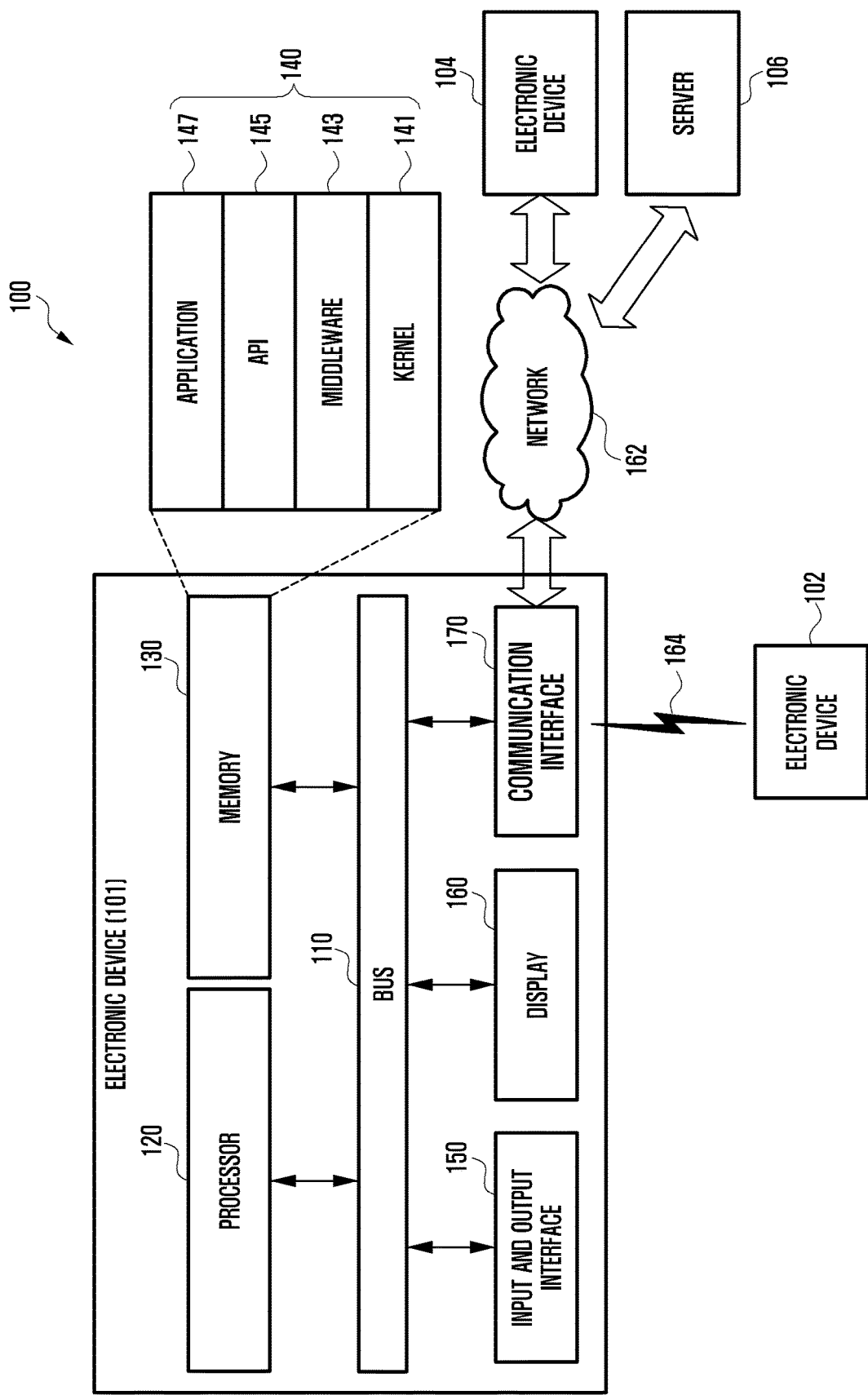
FIG. 1A is a block diagram illustrating an electronic device in a network environment according to various embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present specification will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

In this disclosure, the term "a screen" may often refer to a physical face of a display unit. Examples are shown in the following sentences: "A credit card is displayed on a screen.", "A display unit displays a credit card on a screen.", or "A processor controls a display unit to display a credit card on a screen." Meanwhile, the term "a screen" may also refer to a target (e.g., a page) displayed on a physical face of a display unit. Examples are shown in the following sentences: "A credit card screen is displayed.", "A display unit displays a credit card screen.", or "A processor controls a display unit to display a credit card screen."

In this disclosure, the term "a touch input" refers to a user's touch gesture made to control an electronic device on a display unit. Sometimes, "a touch input" may include a non-contact touch gesture (e.g., a floating or hovering touch) made in a state of being separated from a display unit. Such a touch input may include, but not limited to, a touch-and-hold gesture, a tap gesture (i.e., a touch-and-release gesture), a double tap gesture, a panning gesture, a flick gesture, a touch-and-drag gesture, a pinch gesture, and the like.

In this disclosure, the term "a motion input" refers to a user's motion made to control an electronic device. For example, "a motion input" may include, but not limited to, a motion of rotating a device, a motion of tilting a device, a motion of moving a device in a certain direction, and the like.

In this disclosure, the term "an application" refers to a set of computer programs designed to perform a particular task. Various applications may be applied to this disclosure. For example, "an application" may include, but not limited to, a game application, a video playback application, a map application, a memo application, a calendar application, a phonebook application, a broadcast application, an exercise supporting application, a payment application, a photo folder application, and the like.

In this disclosure, the term "application identification information" may refer to unique information for distinguishing a certain application from the others. For example, such application identifying information may be, but not limited to, an icon, an index item, link information, and the like.

In this disclosure, the term "a user interface (UI) element" refers to an element capable of interacting with a user and offering a visual, audible or olfactory feedback in response to a user input. Such a UI element may be represented in the form of an image, a text, and/or a video. Further, a certain region capable of offering a feedback in response to a user input, even though no information is displayed, may be considered as a UI element. For example, the above-mentioned application identification information may be an example of UI elements.

In this disclosure, the term "content" may include a text, a webpage, an application execution screen, a still image, and a video (or a moving image).

The terms used herein are not limited to the bibliographical meanings and are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic accessory, an electronic tattoo, a smart mirror, or a smart watch).

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync®, Apple TV®, Google TV®, etc.), a game console, an electronic dictionary, an electronic key, a camcorder, or an electronic picture frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MM), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.)

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

The electronic device according to various embodiments of this disclosure may generate a magnetic signal. For example, this magnetic signal generated by the electronic device may be similar to a magnetic signal generated when a magnetic card is swiped through a card reader (e.g., a point-of-sale (POS) reader). For example, a user may pay without a magnetic card by putting the electronic device, which generates a magnetic signal, into complete or close contact with a card reader.

A magnetic communication scheme may be, for example, NFC (Near Field Communication), MST (Magnetic Secure Transmission or near field Magnetic data Stripe Transmission), and the like. These schemes may be different from each other in a data rate (bit/sec), a communication range, and a frequency.

Hereinafter, an electronic device according to various embodiments will be described with reference to the accompanying drawings. In this disclosure, the term "user" may indicate a person or machine (e.g., an artificial intelligence device) which uses such an electronic device.

FIG. 1A illustrates a network environment including an electronic device according to various embodiments of the present disclosure.

Referring to FIG. 1A, an electronic device 101, in a network environment 100, includes a bus 110, a processor 120, a memory 130, an input/output interface 150, a display 160, and a communication interface 170. According to some embodiment, the electronic device 101 may omit at least one of the components or further include another component.

The bus 110 may be a circuit connecting the above described components and transmitting communication (e.g., a control message) between the above described components.

The processor 120 may include one or more of central processing unit (CPU), application processor (AP) or communication processor (CP). For example, the processor 120 may control at least one component of the electronic device 101 and/or execute calculation relating to communication or data processing.

The memory 130 may include volatile and/or non-volatile memory. For example, the memory 130 may store command or data relating to at least one component of the electronic device 101. According to some embodiment, the memory may store software and/or program 140. For example, the program 140 may include a kernel 141, middleware 143, an application programming interface (API) 145, and/or an application 147 and so on. At least one portion of the kernel 141, the middleware 143 and the API 145 may be defined as operating system (OS).

The kernel 141 controls or manages system resources (e.g., the bus 110, the processor 120, or the memory 130) used for executing an operation or function implemented by the remaining other program, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 performs a control for the operation requests (e.g., scheduling or load balancing) by using a method of assigning a priority, by which system resources (e.g., the bus 110, the processor 120, the memory 130 and the like) of the electronic device 101 may be used, to the application 147.

The API 145 is an interface by which the application 147 may control a function provided by the kernel 141 or the middleware 142 and includes, for example, at least one interface or function (e.g., command) for a file control, a window control, image processing, or a character control.

The input/output interface 150 may be interface to transmit command or data inputted by a user or another external device to another component(s) of the electronic device 101. Further, the input/output interface 150 may output the command or data received from the another component(s) of the electronic device 101 to the user or the another external device.

The display 160 may include, for example, liquid crystal display (LCD), light emitting diode (LED), organic LED (OLED), or micro electro mechanical system (MEMS) display, or electronic paper display. The display 160 may display, for example, various contents (text, image, video, icon, or symbol, and so on) to a user. The display 160 may include a touch screen, and receive touch, gesture, approaching, or hovering input using a part of body of the user.

The communication interface 170 may set communication of the electronic device 101 and external device (e.g., a first external device 102, a second external device 104, or a server 106). For example, the communication interface 170 may be connected with the network 162 through wireless communication or wire communication and communicate with the external device (e.g., a second external device 104 or server 106).

Wireless communication may use, as cellular communication protocol, at least one of LTE (long-term evolution), LTE-A (LTE Advance), CDMA (code division multiple access), WCDMA (wideband CDMA), UMTS (universal mobile telecommunications system), WiBro (Wireless Broadband), GSM (Global System for Mobile Communications), and the like, for example. A short-range communication 164 may include, for example, at least one of Wi-Fi, Bluetooth, Near Field Communication (NFC), Magnetic Secure Transmission or near field Magnetic data Stripe Transmission (MST), and Global Navigation Satellite System (GNSS), and the like.

An MST module is capable of generating pulses corresponding to transmission data using electromagnetic signals, so that the pulses can generate magnetic field signals. The electronic device 101 transmits the magnetic field signals to a point of sales (POS) terminal (reader). The POS terminal (reader) detects the magnetic field signal via an MST reader, transforms the detected magnetic field signal into an electrical signal, and thus restores the data.

The GNSS may include at least one of, for example, a Global Positioning System (GPS), a Global navigation satellite system (Glonass®), a Beidou® Navigation Satellite System (hereinafter, referred to as "Beidou"), and Galileo® (European global satellite-based navigation system). Hereinafter, the "GPS" may be interchangeably used with the "GNSS" in the present disclosure. Wired communication may include, for example, at least one of USB (universal serial bus), HDMI (high definition multimedia interface), RS-232 (recommended standard-232), POTS (plain old telephone service), and the like. The network 162 may include telecommunication network, for example, at least one of a computer network (e.g., LAN or WAN), internet, and a telephone network.

Each of the first external device 102 and the second external device 104 may be same type or different type of device with the electronic device 101. According to some embodiment, the server 106 may include one or more group of servers. According to various embodiments, at least one portion of executions executed by the electronic device may be performed by one or more electronic devices (e.g., external electronic device 102, 104, or server 106). According to some embodiments, when the electronic device 101 should perform a function or service automatically, the electronic device 101 may request performing of at least one function to the another device (e.g., external electronic device 102, 104, or server 106). For the above, cloud computing technology, distributed computing technology, or client-server computing technology may be used, for example.

Figure 1B:
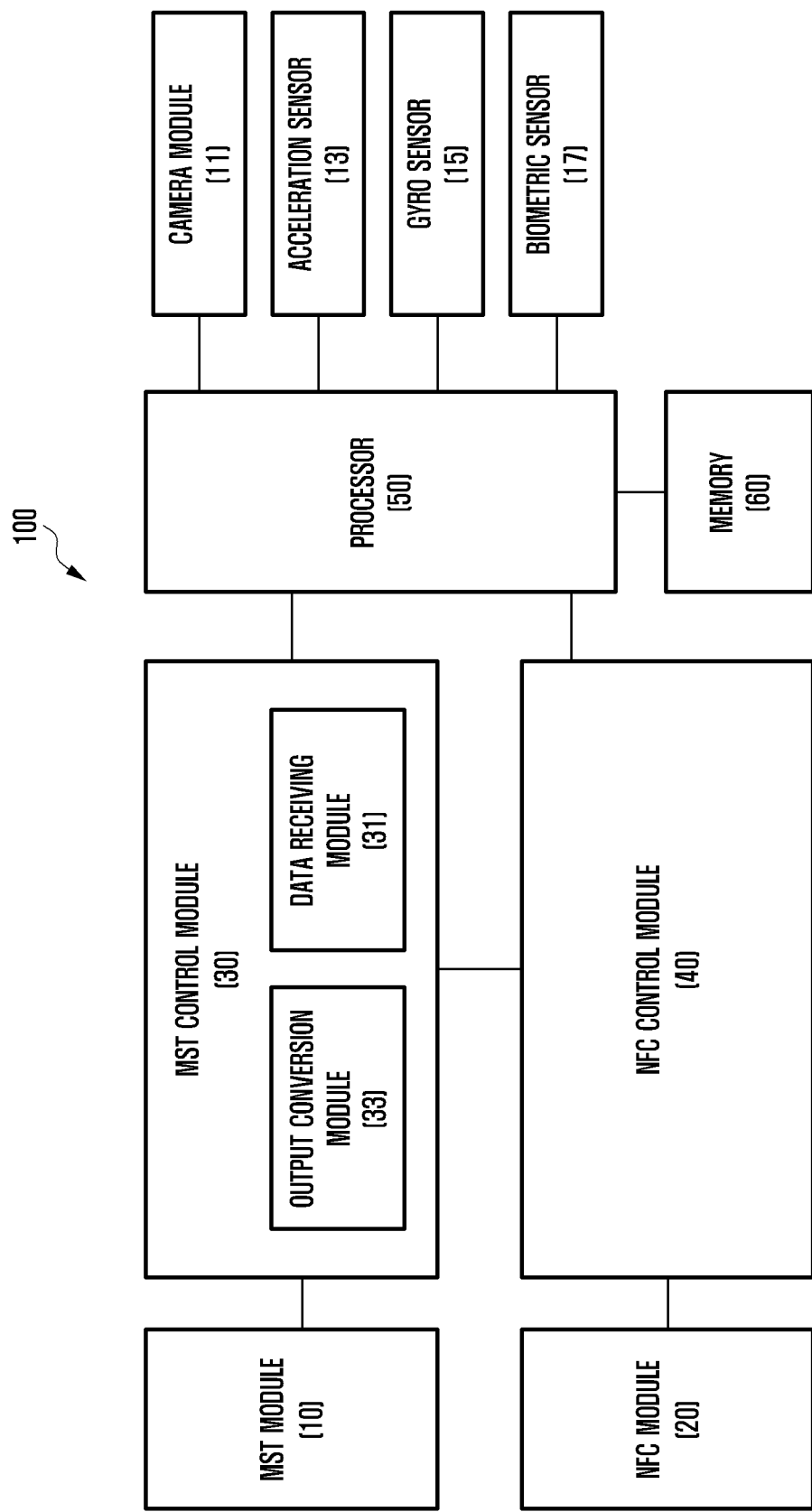
FIG. 1B is a block diagram illustrating an electronic device capable of performing a payment function according to various embodiments of the present disclosure.

FIG. 1B is a block diagram illustrating an electronic device capable of performing a payment function according to various embodiments of the present disclosure. According to an embodiment, the electronic device 100 may include, for example, a camera module 11, an acceleration sensor 13, a gyro sensor 15, a biometric sensor 17, an MDT module 10, an NFC module 20, an MST control module 30, an NFC control module 40, a processor 50, and a memory 60.

According to an embodiment, the camera module 11 may shoot a card (e.g., a credit card) needed for a payment and then obtain information about the card. Using an optical character reader (OCR) function, the camera module 11 may recognize card information (e.g., a card company, a card number, a card expiration date, a card owner, etc.) marked on the card. Additionally or alternatively, a user may enter necessary card information in the electronic device by using an input unit (e.g., a touch panel, a pen sensor, a key, an ultrasonic input unit, a microphone, etc.).

According to an embodiment, for payment, the acceleration sensor 13 or the gyro sensor 15 may obtain location information of the electronic device. This location information may be delivered to the processor 50. Then, based on the location information of the electronic device, the processor 50 may adjust the strength of a magnetic field to be emitted to a POS terminal by adjusting an electric current supplied to an antenna (e.g., a coil antenna) of the MST module 10, or if there are two or more coil antennas, select one of them.

According to an embodiment, the biometric sensor 17 may obtain user's biometric information (e.g., a fingerprint or iris) required for authentication of a user or payment card.

According to an embodiment, the MST module 10 may include a coil antenna. The MST control module 30 may control the direction of an electric current flowing through the coil antenna by applying a voltage to both ends of the coil antenna in different directions depending on a data type (e.g., 0 or 1 bit). A signal emitted through the coil antenna (i.e., a magnetic field signal caused by a coil through which an electric current flows) may generate an induced electromotive force on a POS terminal as if a magnetic card is actually read by the POS terminal.

According to an embodiment, the MST control module 30 may include a data receiving module 31 and an output conversion module 33. The data receiving module 31 may receive a pulse having a logically low/high form and containing payment information from the processor 50 (or a security module equipped in the electronic device 100).

According to an embodiment, the output conversion module 33 may include a circuit for converting data, recognized by the data receiving module 31, into a suitable form for delivery to the MST module 10. This circuit may include a specific circuit (e.g., an H-Bridge) for changing the direction of a voltage applied to both ends of the MST module 10.

According to an embodiment, based on card information entered through the camera module 11 or any other input unit (e.g., a touch panel, a pen sensor, or the like), the electronic device 100 may receive payment information (e.g., track 1, track 2, track 3, or token information) contained in at least part of a magnetic stripe of a card (e.g., a magnetic card) from a card company's or bank's server through a communication module (not shown) and then store the received information in a suitable form for the processor 50 or any additional embedded security module.

Figure 2:
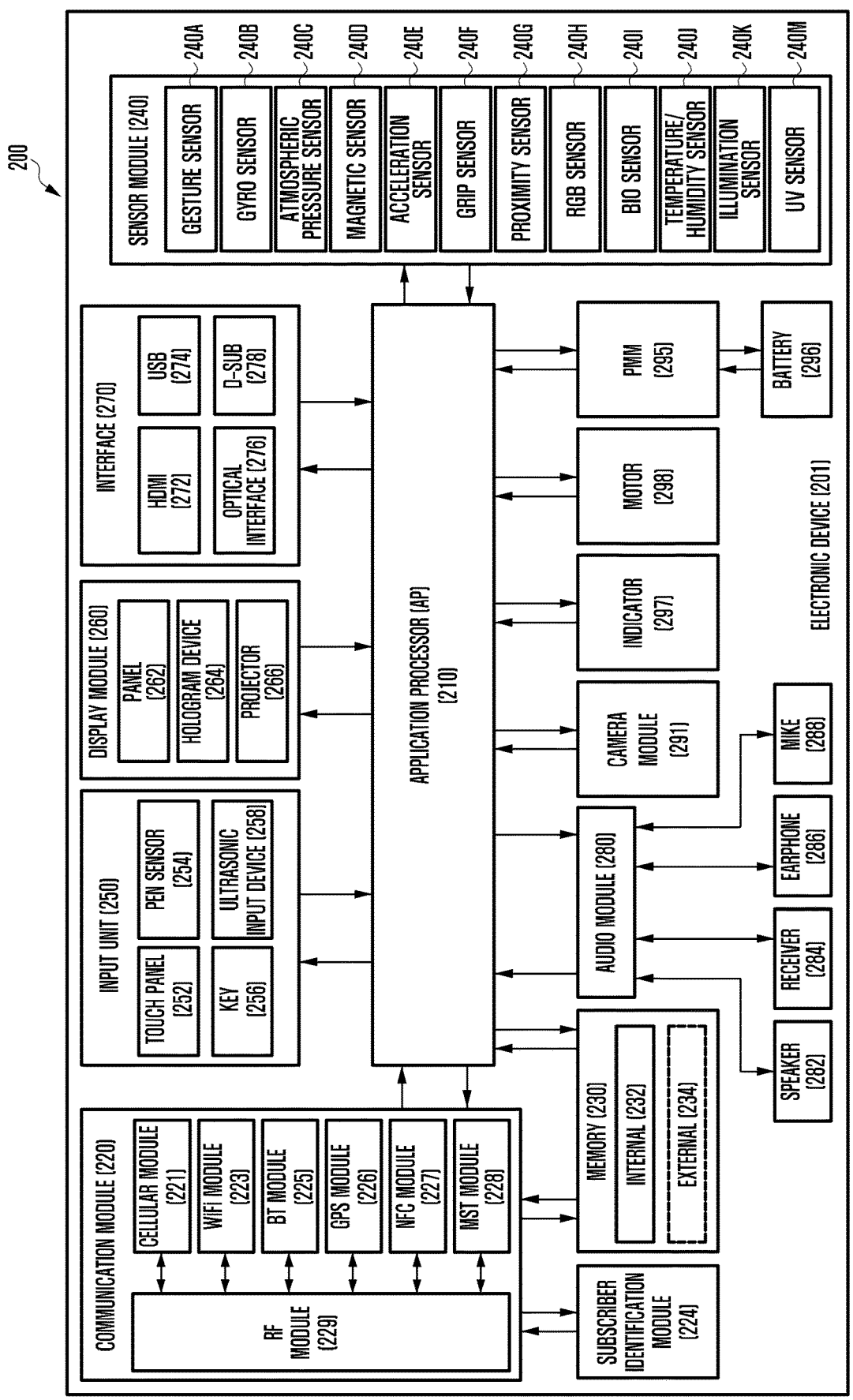
FIG. 2 is a block diagram illustrating an electronic device according to various embodiments of the present disclosure.

FIG. 2 is a detailed block diagram showing a configuration of an electronic device 201 according to various embodiments. For example, the electronic device 201 is capable of including part or all of the components in the electronic device 101 shown in FIG. 1A. The electronic device 201 is capable of including one or more processors 210 (e.g., Application Processors (APs)), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 is capable of driving, for example, an operating system or an application program to control a plurality of hardware or software components connected to the processor 210, processing various data, and performing operations. The processor 210 may be implemented as, for example, a System on Chip (SoC). According to an embodiment, the processor 210 may further include a graphic processing unit (GPU) and/or an image signal processor. The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 107 shown in FIG. 1A. For example, the communication module 220 is capable of including a cellular module 221, WiFi module 223, Bluetooth® (BT) module 225, GNSS module 226 (e.g., a GPS module, Glonass® module, Beidou® module or Galileo® module), NFC module 227, MST module 228, and Radio Frequency (RF) module 229.

The cellular module 221 is capable of providing a voice call, a video call, an SMS service, an Internet service, etc., through a communication network, for example. According to an embodiment, the cellular module 221 is capable of identifying and authenticating an electronic device 201 in a communication network by using a subscriber identification module (SIM) 224 (e.g., a SIM card). According to an embodiment, the cellular module 221 is capable of performing at least part of the functions provided by the processor 210. According to an embodiment, the cellular module 221 is also capable of including a communication processor (CP).

Each of the WiFi module 223, the BT module 225, the GNSS module 226, and the NFC module 227 is capable of including a processor for processing data transmitted or received through the corresponding module. The MST module 228 is capable of including a processor for processing data transmitted or received through the corresponding module. According to embodiments, at least part of the cellular module 221, WiFi module 223, BT module 225, GNSS module 226, NFC module 227, and MST module 228 (e.g., two or more modules) may be included in one integrated chip (IC) or one IC package.

The RF module 229 is capable of transmission/reception of communication signals, e.g., RF signals. The RF module 229 is capable of including a transceiver, a power amp module (PAM), a frequency filter, a low noise amplifier (LNA), an antenna, etc. According to another embodiment, at least one of the following modules: cellular module 221, WiFi module 223, BT module 225, GNSS module 226, NFC module 227, and MST module 228 is capable of transmission/reception of RF signals through a separate RF module.

The SIM module 224 is capable of including a card including a subscriber identification module (SIM) and/or an embodied SIM. The SIM module 224 is also capable of containing unique identification information, e.g., integrated circuit card identifier (ICCID), or subscriber information, e.g., international mobile subscriber identity (IMSI).

The memory 230 (e.g., memory 130 shown in FIG. 1A) is capable of including a built-in memory 232 or an external memory 234. The built-in memory 232 is capable of including at least one of the following: a volatile memory, e.g., a dynamic RAM (DRAM), a static RAM (SRAM), a synchronous dynamic RAM (SDRAM), etc.; and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 is also capable of including a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 is capable of being connected to the electronic device 201, functionally and/or physically, through various interfaces.

The memory 230 may store a payment application, which is one of the application programs 147, and payment information. This payment information may include a card number and a password for each card. Also, the payment information may further include information (e.g., fingerprint information, facial feature information, or voice feature information) required for user authentication.

When executed by the processor 210, the payment application may be set to enable the processor 210 to perform operations of interacting with a user for payment (e.g., operations of displaying a screen for selection of a card (an image) and obtaining information (e.g., a card number) about the selected card (or a predetermined card)) and operations of controlling a magnetic field communication (e.g., an operation of transmitting card information to an external device (e.g., a card reader) through the MST module 228).

The sensor module 240 is capable of measuring/detecting a physical quantity or an operation state of the electronic device 201, and converting the measured or detected information into an electronic signal. The sensor module 240 is capable of including at least one of the following: a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and a ultraviolet (UV) sensor 240M. Additionally or alternatively, the sensor module 240 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 is capable of further including a control circuit for controlling one or more sensors included therein. In embodiments, the electronic device 201 is capable of including a processor, configured as part of the processor 210 or a separate component, for controlling the sensor module 240. In this case, while the processor 210 is operating in sleep mode, the processor is capable of controlling the sensor module 240.

The input device 250 is capable of including a touch panel 252, a (digital) pen sensor 254, a key 256, or an ultrasonic input unit 258. The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user.

The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 (e.g., the display 160 shown in FIG. 1) is capable of including a panel 262, a hologram unit 264, or a projector 266. The panel 262 may include the same or similar configurations as the display 160 shown in FIG. 1A. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment, the display 260 may further include a control circuit for controlling the panel 262, the hologram unit 264, or the projector 266.

The interface 270 is capable of including a high-definition multimedia interface (HDMI) 272, a universal serial bus (USB) 274, an optical interface 276, or a D-subminiature (D-sub) 278. The interface 270 may be included in the communication interface 170 shown in FIG. 1A. Additionally or alternatively, the interface 270 is capable of including a mobile high-definition link (MHL) interface, a secure digital (SD) card/multimedia card (MMC) interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1A. The audio module 280 is capable of processing sound information input or output through a speaker 282, a receiver 284, earphones 286, microphone 288, etc.

The camera module 291 refers to a device capable of taking both still and moving images. According to an embodiment, the camera module 291 is capable of including one or more image sensors (e.g., a front image sensor or a rear image sensor), a lens, an image signal processor (ISP), a flash (e.g., an LED or xenon lamp), etc.

The power management module 295 is capable of managing power of the electronic device 201. According to an embodiment, the power management module 295 is capable of including a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. Although not shown, the electronic device 201 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Each of the elements described in the present disclosure may be formed with one or more components, and the names of the corresponding elements may vary according to the type of the electronic device. In various embodiments, the electronic device may include at least one of the above described elements described in the present disclosure, and may exclude some of the elements or further include other additional elements. Further, some of the elements of the electronic device according to various embodiments may be coupled to form a single entity while performing the same functions as those of the corresponding elements before the coupling.

Figure 3:
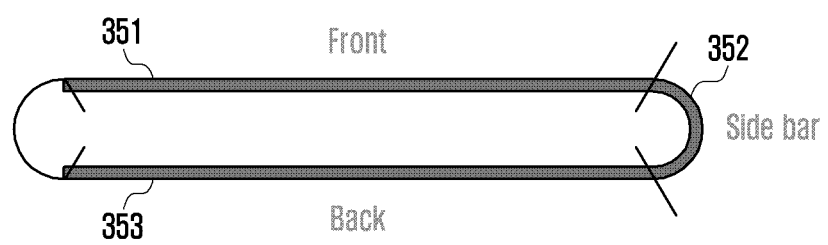
FIG. 3 is a cross-sectional view illustrating an electronic device according to various embodiments of the present disclosure.

FIG. 3 is a cross-sectional view illustrating an electronic device according to various embodiments of the present disclosure.

Referring to FIG. 3, a display may cover the front, side and back faces of the electronic device. Namely, the display may include a front display region 351, a side display region 352, and a back display region 353. When the front display region 351 faces the user, the back display region 353 may be placed in the screen-off state. On the contrary, when the back display region 353 faces the user, the front display region 351 may be placed in the screen-off state. At least part of the side display region 352 may maintain the screen-on state together with the front display region 351. Similarly, at least part of the side of display region 352 may maintain the screen-on state together with the back display region 353. The screen-on state refers to a state where content are displayed on the display, whereas the screen-off state refers to a state where the display is turned off. Since the side display region 352 has a certain radius of curvature, the user can see a part of the side display region 352 when he or she looks at the display in front of the electronic device. Similarly, the user can see a part of the side display region 352 when looking at the display in back of the electronic device.

Although the bended display may display content on the front and back display regions 351 and 353, the user cannot see the front and back display regions 351 and 353 simultaneously. The electronic device may display a part of content, displayed on the front or back display region 351 or 353, on the side display region 352, thereby providing part of information displayed on a region which is not seen by the user. For example, when the user looks at the front display region 351, the electronic device may display, on the side display region 352, a part of content displayed on the back display region 353. Similarly, when the user looks at the back display region 353, the electronic device may display, on the side display region 352, a part of content displayed on the front display region 351. Specifically, depending on a signal outputted from the sensor module, the processor may control the display such that a part of first content, displayed on the front display region 351, can be displayed on the side display region 352 or such that a part of second content, displayed on the back display region 353, can be displayed on the side display region 352. For example, when the user looks at the front display region 351, the processor may receive a first value from the acceleration sensor included in the sensor module and then display, on the side display region 352, a part of the first content capable of being displayed on the front display region 351. Similarly, when the user looks at the back display region 353, the processor may receive a second value from the acceleration sensor included in the sensor module and then display, on the side display region 352, a part of the second content capable of being displayed on the back display region 353. In this case, a part of the first content may indicate part of information contained in the first content, and a part of the second content may indicate part of information contained in the second content.

Figure 4:
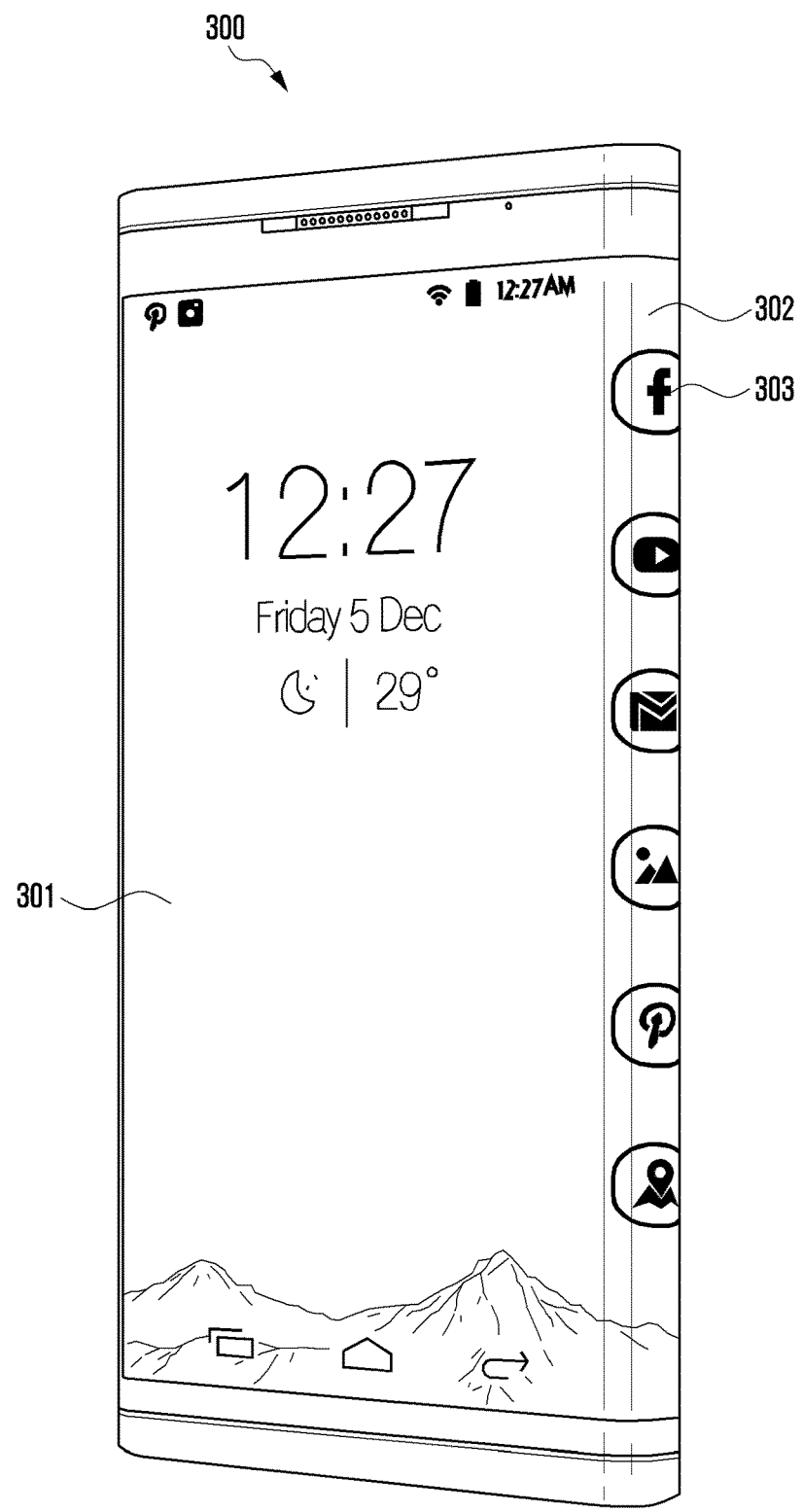
FIG. 4 is a perspective view illustrating front and side faces of an electronic device according to various embodiments of the present disclosure.

FIG. 4 is a perspective view illustrating front and side faces of an electronic device according to various embodiments of the present disclosure.

Referring to FIG. 4, the front display region 301 and the side display region 302 are shown. Content may be displayed on the front display region 301. An icon 303 for executing an application may be displayed on the side display region 302. When the user touches the icon 303 displayed on the side display region 302, the processor may control the display to display certain content on the front display region 301 in response to the execution of a specific application corresponding to the icon 303. Also, when the user touches the icon 303 displayed on the side display region 302 while certain content is displayed on the front display region 301, the processor may control the display to display related content on the back display region (not shown) in response to the execution of the application corresponding to the icon 303. For example, if the user touches a search icon displayed on the side display region 302 while a webpage is displayed on the front display region 301, the back display region may display a search result.

Additionally, a control button may be displayed on the side display region 302. The control button may be a button for controlling certain content displayed on the front or back display region. For example, if a video is played on the front or back display region, control buttons for playing, stopping, fast-forwarding and fast-rewinding the video may be displayed on the side display region. If a camera application is executed on the front or back display region, a shooting button, a menu button, and/or the like may be displayed on the side display region.

Additionally, a UI element based on a user input detected from the front or back display region may be displayed on the side display region. For example, if a numeric keypad button is displayed on the front display region, and if the user enters a phone number through the numeric keypad button, the entered phone number may be displayed on the side display region.

Additionally, a notification message may be displayed on the side display region. For example, when a text message is received, part or all of the text message may be displayed on the side display region. Also, when a call is received, a call button or a reject button may be displayed on the side display region.

The processor may control the display such that content is displayed on the front display region 301 and also the icon 303 is displayed on the side display region 302. Additionally, the processor may control the display such that the back display region (not shown) is turned off. The processor may detect a user-facing face of the electronic device, based on a signal outputted from the sensor module. Then the processor may control the display to display certain content on a specific display region corresponding to the user-facing face. For example, if it is detected that the user looks at the front display region 301, the processor may control the display to display certain content on the front display region 301. At this time, the processor may also control the display to turn off the back display region. If the user inverts the electronic device, the processor may detect the inversion of the electronic device, based on a signal outputted from the acceleration sensor, and then control the display to display related content on the back display region.

Figure 5:
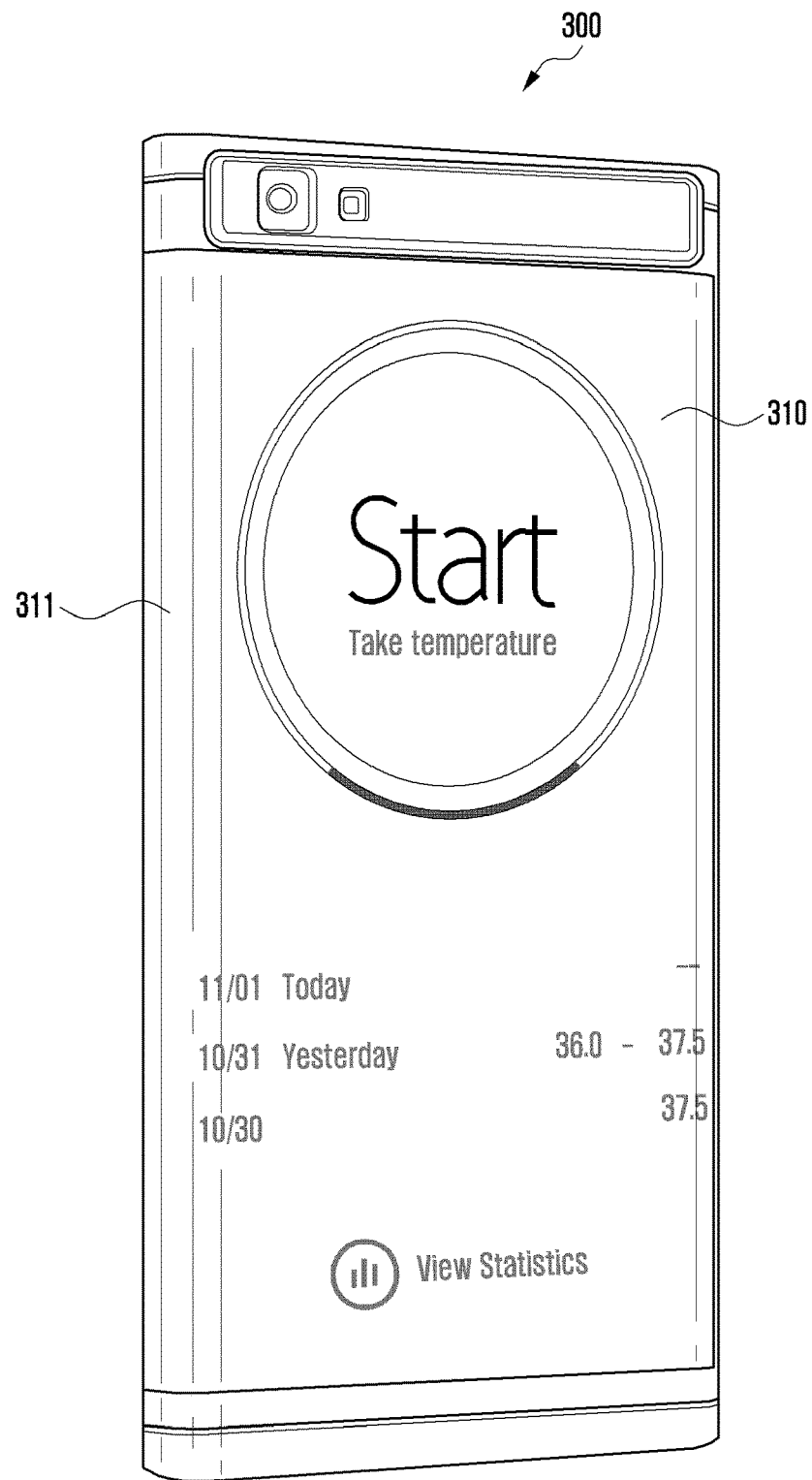
FIG. 5 is a perspective view illustrating back and side faces of an electronic device according to various embodiments of the present disclosure.

FIG. 5 is a perspective view illustrating back and side faces of an electronic device according to various embodiments of the present disclosure.

Referring to FIG. 5, the back display region 310 and a part of the side display region 311 are shown. Depending on whether the user looks at the back display region 310, the electronic device may display certain content on the back display region 310.

The electronic device may recognize whether the user looks at the back display region 310, through a camera (hereinafter referred to as 'a rear camera') equipped on the back of the electronic device. Based on a signal outputted from the rear camera, the processor may display certain content on the back display region 310. Namely, the processor may analyze a subject inputted through the rear camera, determine whether the user looks at the back display region 310, and thereby display content on the back display region 310.

Also, the processor may display content on the back display region 310, based on an event occurring at the electronic device and/or a signal outputted from the sensor module. For example, if a text message is received while first content is displayed on the front display region (not shown), a UI element corresponding to the text message may be displayed on a part of the front display region. In this situation, if the user inverts the electronic device, an execution screen of a text message application may be displayed on the back display region 310. Namely, a signal is outputted from the acceleration sensor when the user inverts the electronic device, and the processor may control the display to display content on the back display region 310, based on the signal received from the acceleration sensor included in the sensor module.

The back display region 310 may display details of content displayed on the front display region. For example, if two or more thumbnail images are displayed on the front display region, and if the user selects one of the displayed thumbnail images, the selected thumbnail image may be displayed in an enlarged form on the back display region 310. In another example, if a first webpage is displayed on the front display region, and if the user clicks a certain link contained in the first webpage, a second webpage corresponding to the clicked link may be displayed on the back display region 310. In still another example, if an email program is executed on the front display region, and if the user clicks a file attached to a certain email, the clicked file may be opened and displayed on the back display region 310.

Additionally, if any content displayed on the front display region has a hierarchical structure of screens, a lower-layered screen of the content displayed on the front display region may be displayed on the back display region 310. Similarly, if a first-layer menu is displayed on the front display region, and if the user selects one of menu items contained in the first layer, a second-layer menu or content corresponding to the selected item may be displayed on the back display region 310. Also, if a list of videos is displayed on the front display region, and if the user selects one of such videos, the selected video may be played on the back display region 310.

FIGS. 6A to 6D are diagrams illustrating operation of displaying content on front, side and back display regions of an electronic device according to various embodiments of the present disclosure.

In typical electronic devices, if a notification is received while a certain task is performed, the user may check details of the received notification by dragging downward a notification panel or by changing a currently displayed screen to a new screen associated with notification. Namely, typical electronic devices require two- or three-step user interactions for checking a notification.

According to various embodiment of this disclosure, in order to realize a zero-depth UI for checking a notification without interrupting a currently performed task, the electronic device displays, in an overlay form, notification information on content when a notification is received while the content is displayed on the front display 601, and then displays details of the notification on the back display region 621 when a user's action to invert the electronic device is detected. Since the content displayed on the front display region 601 does not disappear, the user can check the notification without any interruption of a current task. In addition, contrary to typical technique to require two- or three-step user interactions for checking the notification, this disclosure can reduce user interactions to a zero step because of requiring only an interaction of inverting the electronic device.

Figure 6A:
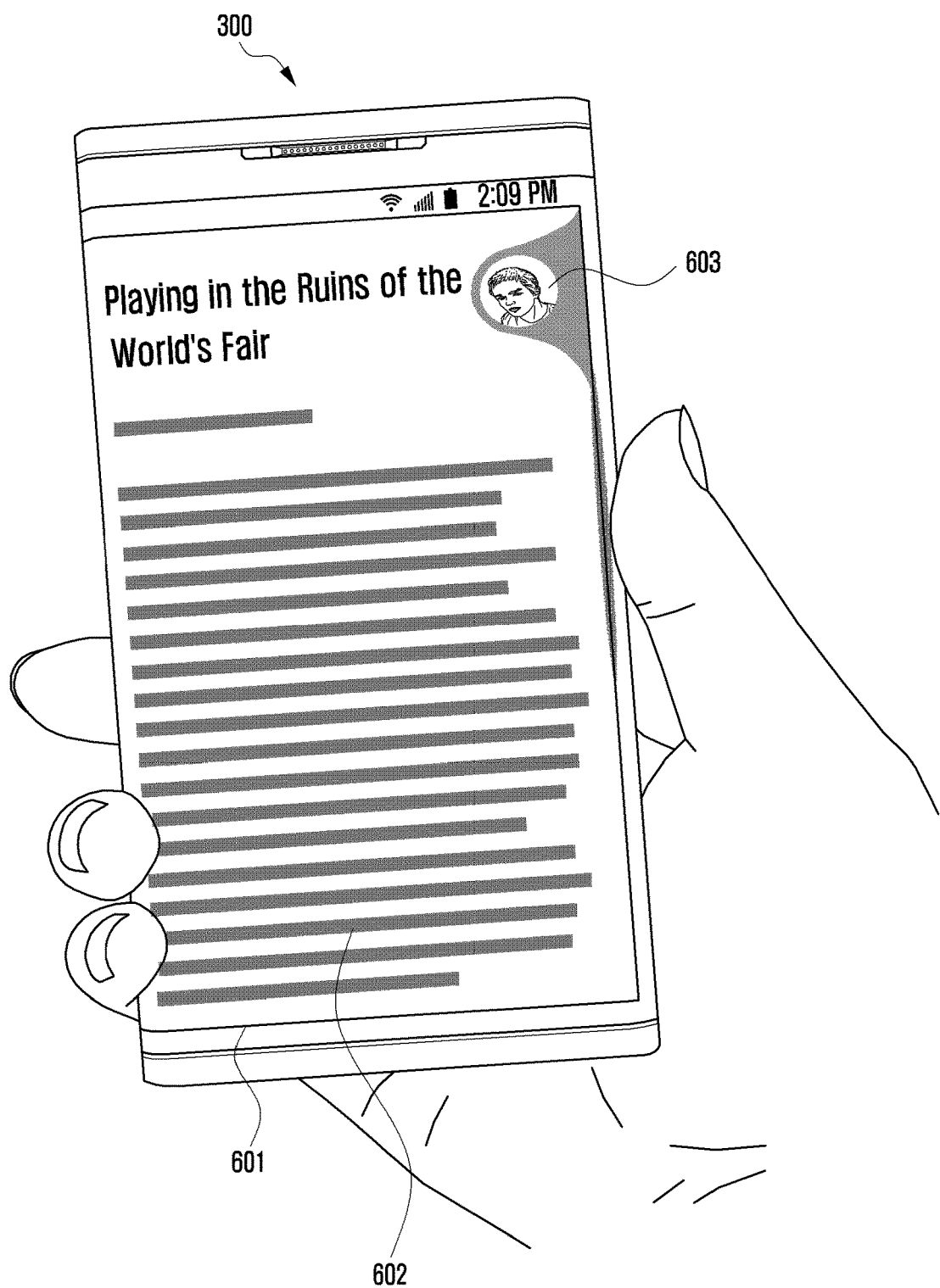
FIGS. 6A to 6D are diagrams illustrating operation of displaying content on front, side and back display regions of an electronic device according to various embodiments of the present disclosure.

Referring to FIG. 6A, content 602 is displayed on the front display region 601 of the electronic device 300. The back display region 621 may be turned off. If any event occurs while the content 602 is displayed on the front display region 601, the electronic device 300 may display a graphic object 603 corresponding to the occurring event on the front display region 601. This event may be, for example, a notification. The graphic object 603 may be an image of a notification-creating subject, e.g., an image of a message sender's face. Alternatively, the graphic object 603 may be a telephone icon. Alternatively, the graphic object 603 may be a letter, pattern or symbol representing the type of information.

The graphic object 603 may be displayed on the content 602 in an overlay form. Also, the graphic object 603 may be displayed with an animation effect from the side display region 611. Namely, the graphic object 603 may be displayed as if it gradually appears from the side display region 611 to the front display region 601. In this case, the content displayed on the front display region 601 may be executed continuously. Namely, the currently performed task is not interrupted by the occurrence of a notification and continues to be performed while the user checks details of the notification.

If the user inverts the electronic device 300, the electronic device may display a first screen 625 corresponding to the graphic object 603 on the back display region 621. The processor may detect the inversion of the electronic device through the sensor module and then, based on the detected motion (i.e., inversion) of the electronic device, control the display to display the first screen 625 corresponding to the graphic object 603 on the back display region 621. At this time, the content displayed on the front display region 601 may be displayed continuously. Namely, the currently performed task is not interrupted by the occurrence of a notification and continues to be performed while the user checks details of the notification. While performing the task on the front display region 601 without interruption, the electronic device may control the display to display the first screen 625 corresponding to the graphic object 603 on the back display region 621. The first screen 625 corresponding to the graphic object 603 may be a detailed screen corresponding to the graphic object 603. For example, if the graphic object 603 is an image of a message sender's face, the first screen 625 may be a message chat window. If the graphic object 603 is an alarm indication, the first screen 625 may be a calendar screen.

Figure 6B:
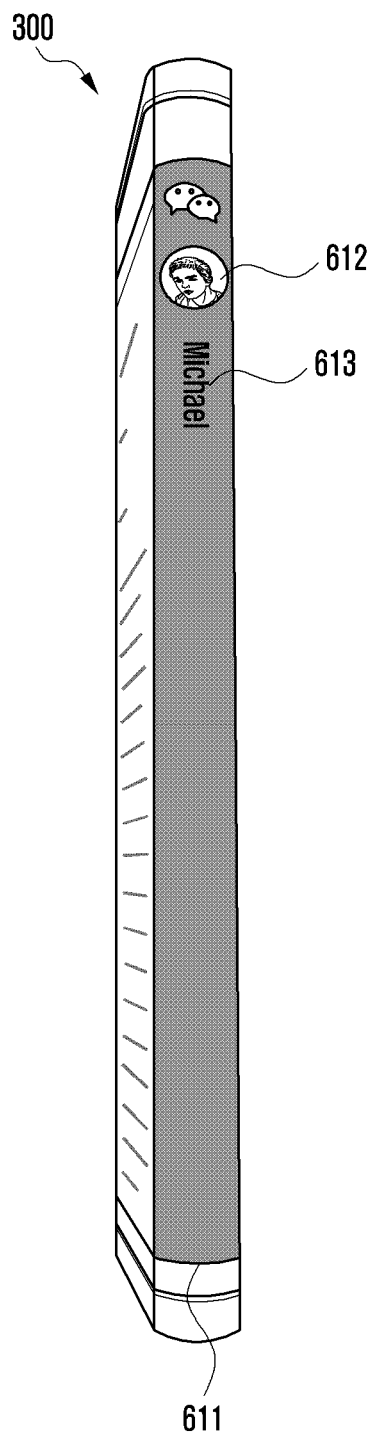

Referring to FIG. 6B, a second screen corresponding to the graphic object 603 may be displayed on the side display region 611. The second screen may be part of the content displayed on the first screen 625. Also, the second screen may include partial information about the content displayed on the first screen 625. For example, if the first screen 625 is a message chat window, the second screen may a part of the chat window. On the second screen, a message sender's face image 612 and a recent chat phrase 613 may be displayed. The second screen displayed on the side display region 611 may appear when an event occurs in the electronic device. Also, the second screen displayed on the side display region 611 may appear based on the motion of the electronic device. If the electronic device is inverted in a state where a notification event occurs in the electronic device, the processor detect may detect the motion of the electronic device through the sensor module and then, based on a signal outputted from the sensor module, display the second screen on the side display region 611.

Figure 6C:
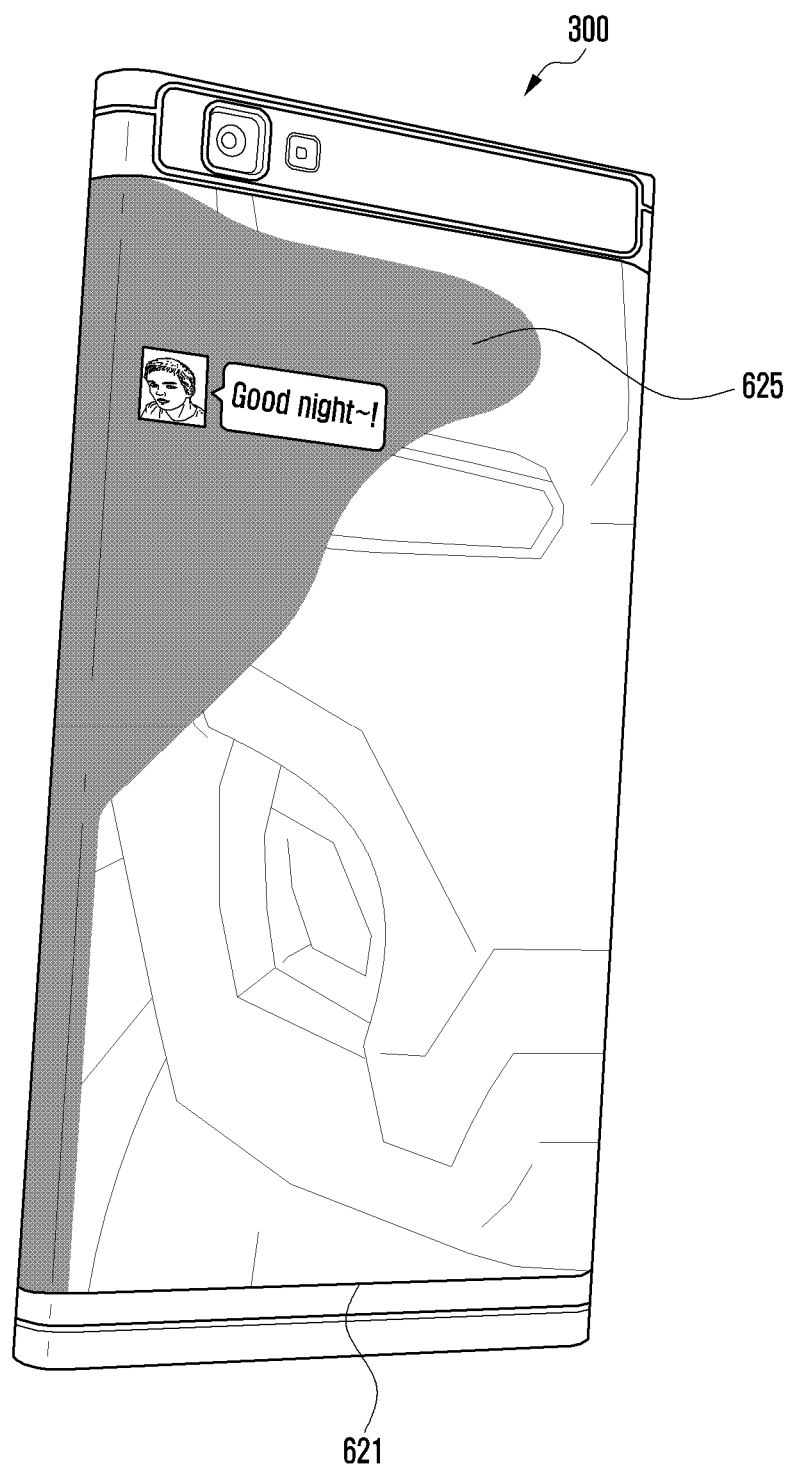

Referring to FIG. 6C, a part of the first screen 625 is shown on the back display region 621. When the first screen 625 is displayed on the back display region 621, the electronic device may give an animation effect. For example, the first screen 625 may be displayed on the back display region 621 as if it gradually spreads from an upper part of the back display region 621 to a lower part. The spreading speed of the first screen 625 may vary depending on a tilted angle of the electronic device. Specifically, the processor may determine the spreading speed of the first screen 625, based on a signal outputted from the acceleration sensor included in the sensor module. Also, the processor may determine the displaying speed of the first screen 615, based on a signal outputted from the acceleration sensor included in the sensor module.

Figure 6D:
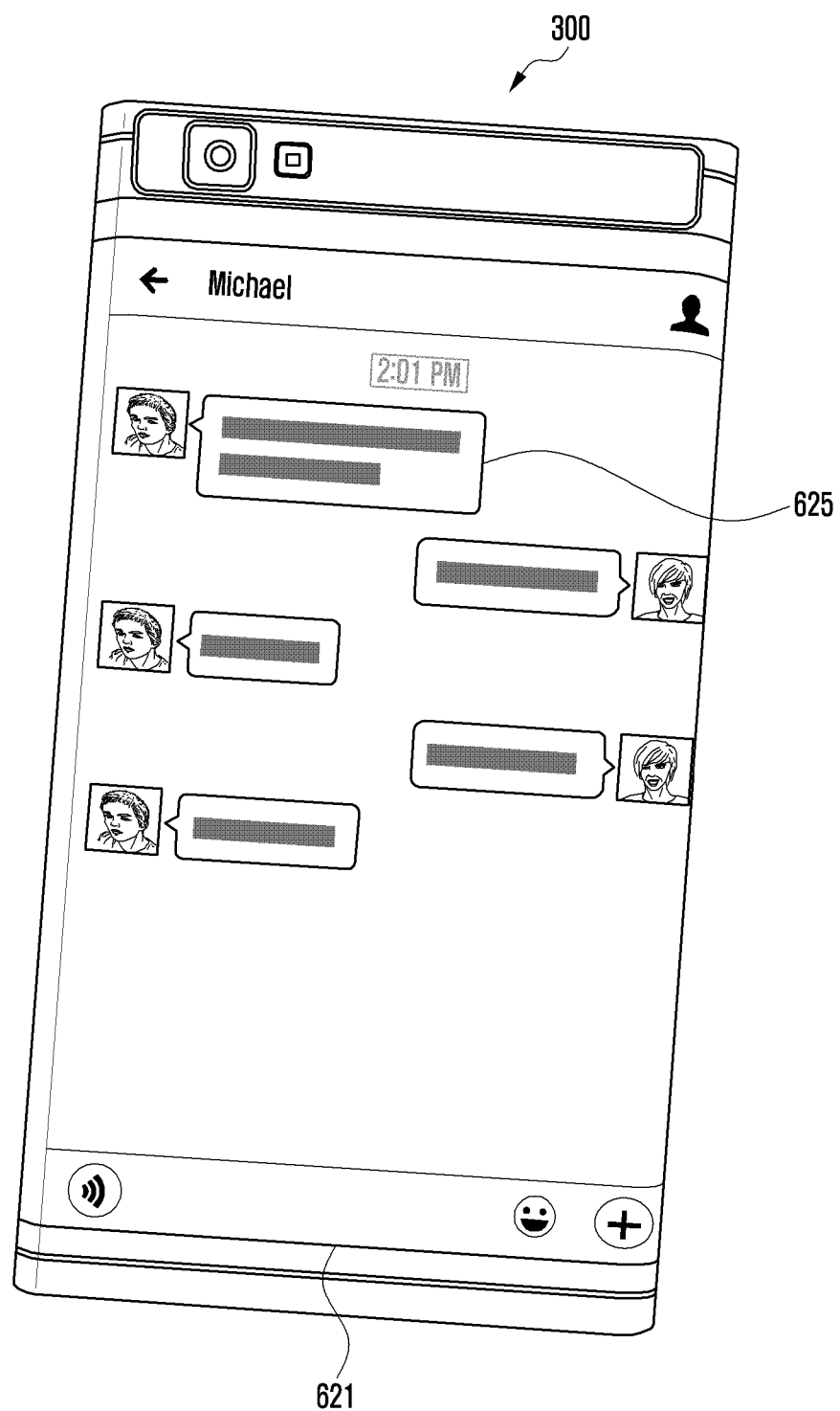

Referring to FIG. 6D, the first screen 625 is displayed on the back display region 621. The first screen 625 may be displayed on the back display region 621 as if it gradually spreads with an animation effect as shown in FIG. 6C. The spreading direction of the first screen 625 may be identical with the direction of gravity. The processor may determine the spreading direction of the first screen 625, based on a signal outputted from the acceleration sensor, and then control the display such that the first screen 625 can be displayed, as if spreading, on the back display region 621. The first screen 625 may contain detailed information corresponding to a notification. For example, if the notification is a text message, sent and received messages may be displayed on the first screen 625.

Figure 7:
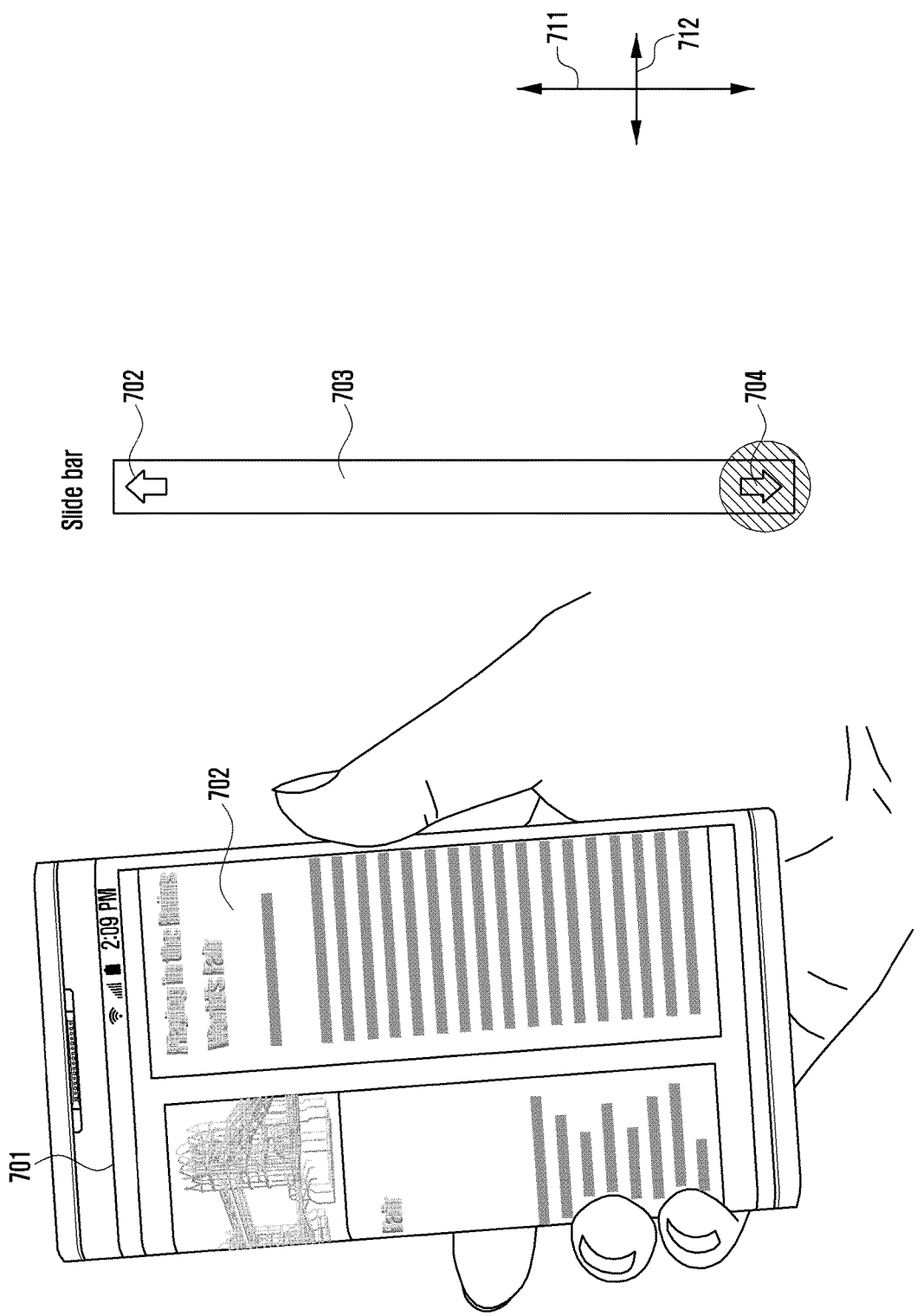
FIG. 7 is a diagram illustrating an example of controlling, through a side display region, content displayed on a front display region.

FIG. 7 is a diagram illustrating an example of controlling, through a side display region, content displayed on a front display region.

Referring to FIG. 7, content 702 is displayed on the front display region 701. On the side display region 703, control buttons 704 and 705 may be displayed to scroll the content 702 upward and downward. If the user flicks a finger leftward or rightward on the side display region 703, the content 702 may be scrolled in the left or right direction 712 or a page thereof may be turned over. If the user flicks or drags a finger upward or downward on the side display region 703, the content 702 may be scrolled in the up or down direction 711. When the user touches the upward control button 705 displayed on the side display region 703, the uppermost part of the content 702 may be displayed on the front display region 701. When the user touches the downward control button 704 displayed on the side display region 703, the lowermost part of the content 702 may be displayed on the front display region 701. For example, if the content 702 is a list of one hundred items, and if the user touches the upward control button 705 on the side display region, the first item may be displayed on the top of the front display region 701. In this case, if the user touches the downward control button 704 on the side display region 703, the hundredth item may be displayed on the bottom of front display region 701.

Figure 8:
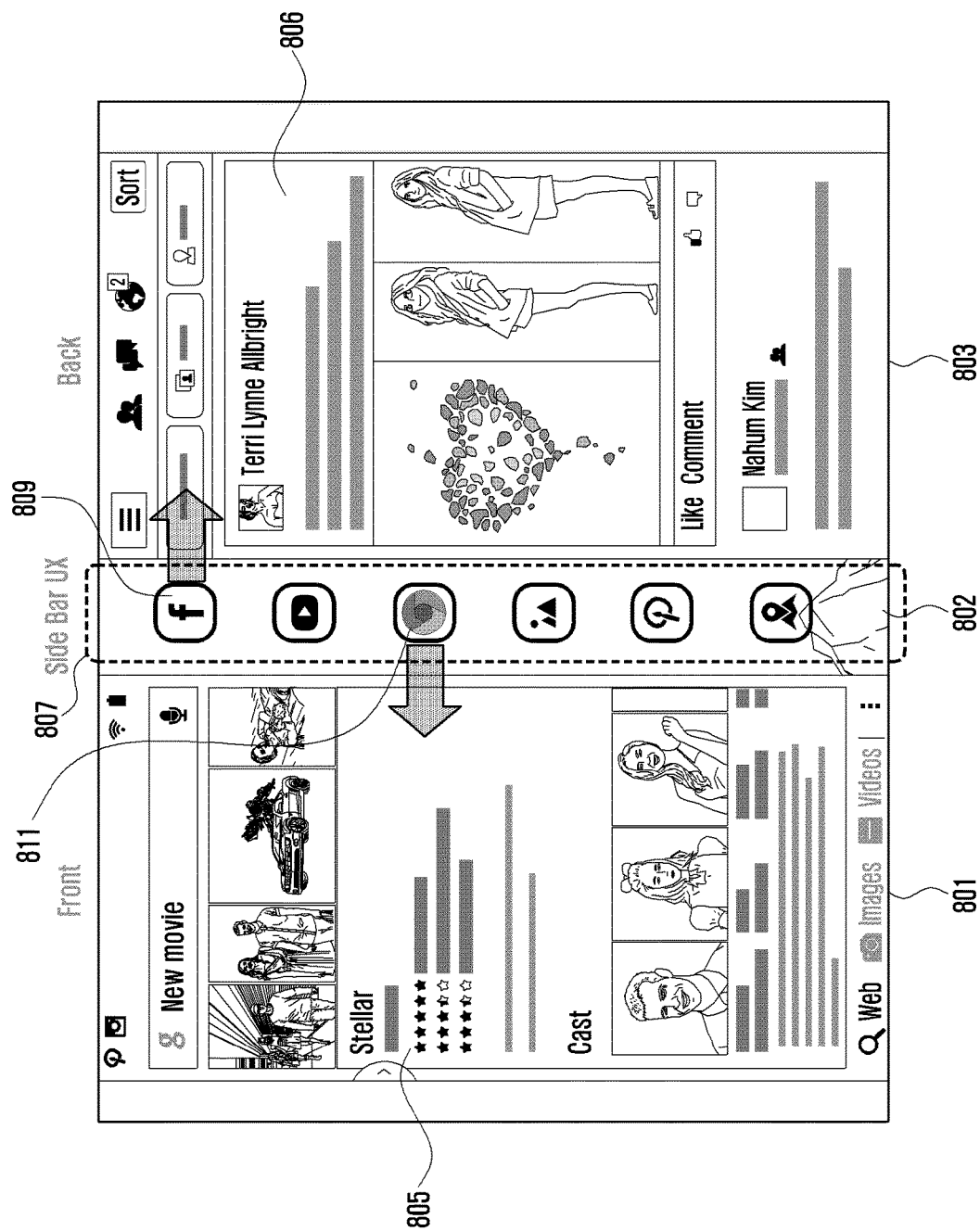
FIG. 8 is a diagram illustrating an example of touching an icon displayed on a side display region and thereby executing an application corresponding to the icon.

FIG. 8 is a diagram illustrating an example of touching an icon displayed on a side display region and thereby executing an application corresponding to the icon.

Referring to FIG. 8, the front display region 801, the side display region 802, and the back display region 803 are shown. Although FIG. 8 depicts unfolded display regions 801, 802 and 803 for the purpose of better understanding, these display regions actually enclose the front, side and back faces of the electronic device.

The side display region 802 may display a plurality of icons 807 for executing corresponding applications. If the user selects one of the icons 807 on the side display region 802 and then drags the selected icon leftward, the front display region 801 may display an execution screen 805 of an application corresponding to the selected icon. Similarly, if the user selects one of the icons 807 on the side display region 802 and then drags the selected icon rightward, the back display region 803 may display an execution screen 806 of an application corresponding to the selected icon.

Namely, based on a user input of dragging one of the displayed icons leftward on the side display region 802, the processor may execute a specific application corresponding to the dragged icon and also display a related screen on the front display region 801. Similarly, based on a user input of dragging one of the displayed icons rightward on the side display region 802, the processor may execute a specific application corresponding to the dragged icon and also display a related screen on the back display region 803.

For example, if the user drags leftward the first icon 811 displayed on the side display region 802, the first application corresponding to the first icon 811 is executed and an execution screen 805 thereof may be displayed on the front display region 801. Similarly, if the user drags rightward the second icon 809 displayed on the side display region 802, the second application corresponding to the second icon 809 is executed and an execution screen 806 thereof may be displayed on the back display region 803.

Figure 9:
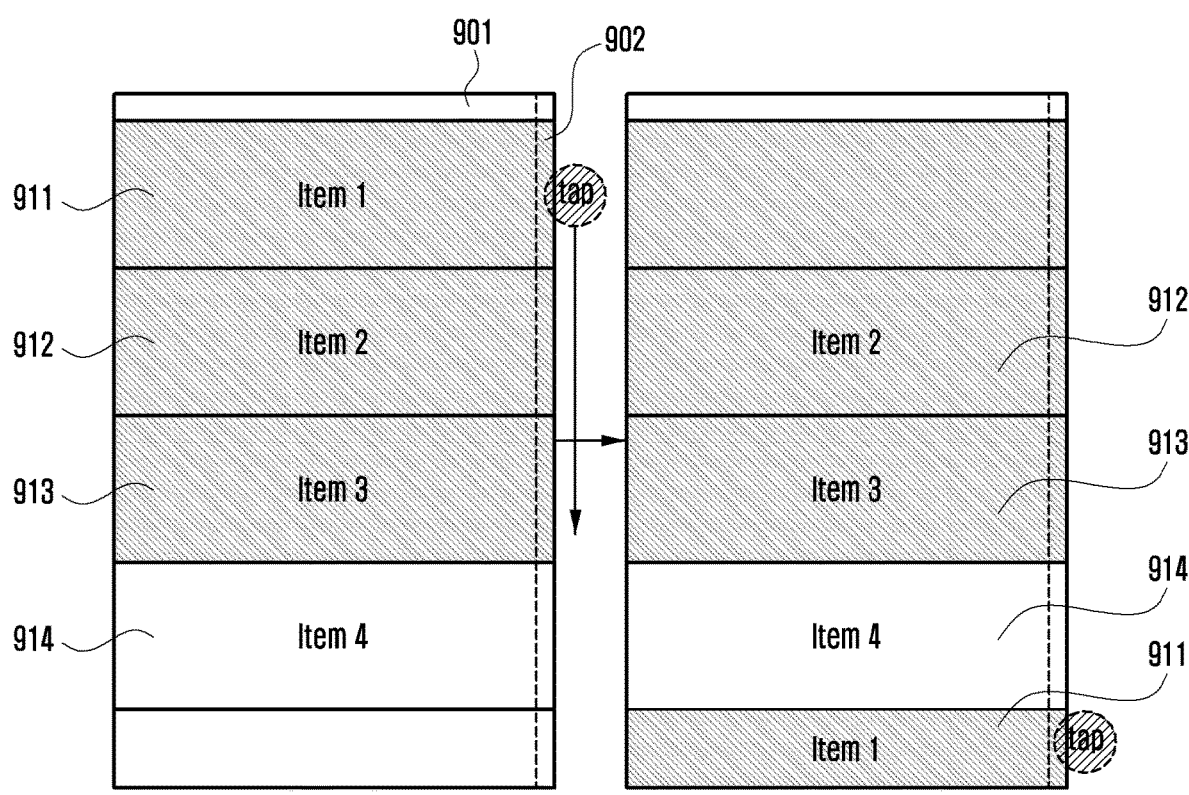
FIG. 9 is a diagram illustrating an example of moving an item by using a side display region when a list of items is displayed on a front display region.

FIG. 9 is a diagram illustrating an example of moving an item by using a side display region when a list of items is displayed on a front display region.

Referring to FIG. 9, the front display region 901 and the side display region 902 are shown. The front display region 901 may display a list of a plurality of items 911, 912, 913 and 914. The side display region 902 may display a part of the list. The user may select one or more items by taking a drag action on the side display region 902. For example, if the user taps the side display region corresponding to the item 911 and then drags, the items 911, 912 and 913 contained in a dragged region may be selected. The selected items 911, 912 and 913 may be displayed to be visually distinguished from non-selected items. For example, the selected items 911, 912 and 913 may be highlighted or changed in color. Namely, the electronic device may receive user's tap and drag actions on the side display region 902 and then, based on the user's drag action, select at least one item. Specifically, if a user's tap and drag input is detected from the side display region 902 while the list is displayed on the front display region 901, the processor may identify the location of the drag input and then control the display to display the corresponding item at the identified location in a highlighted form.

Namely, the processor may detect a user's drag action from the side display region 902 and then, depending on the user's drag action, control the display such that an item can be selected.

Figure 10:
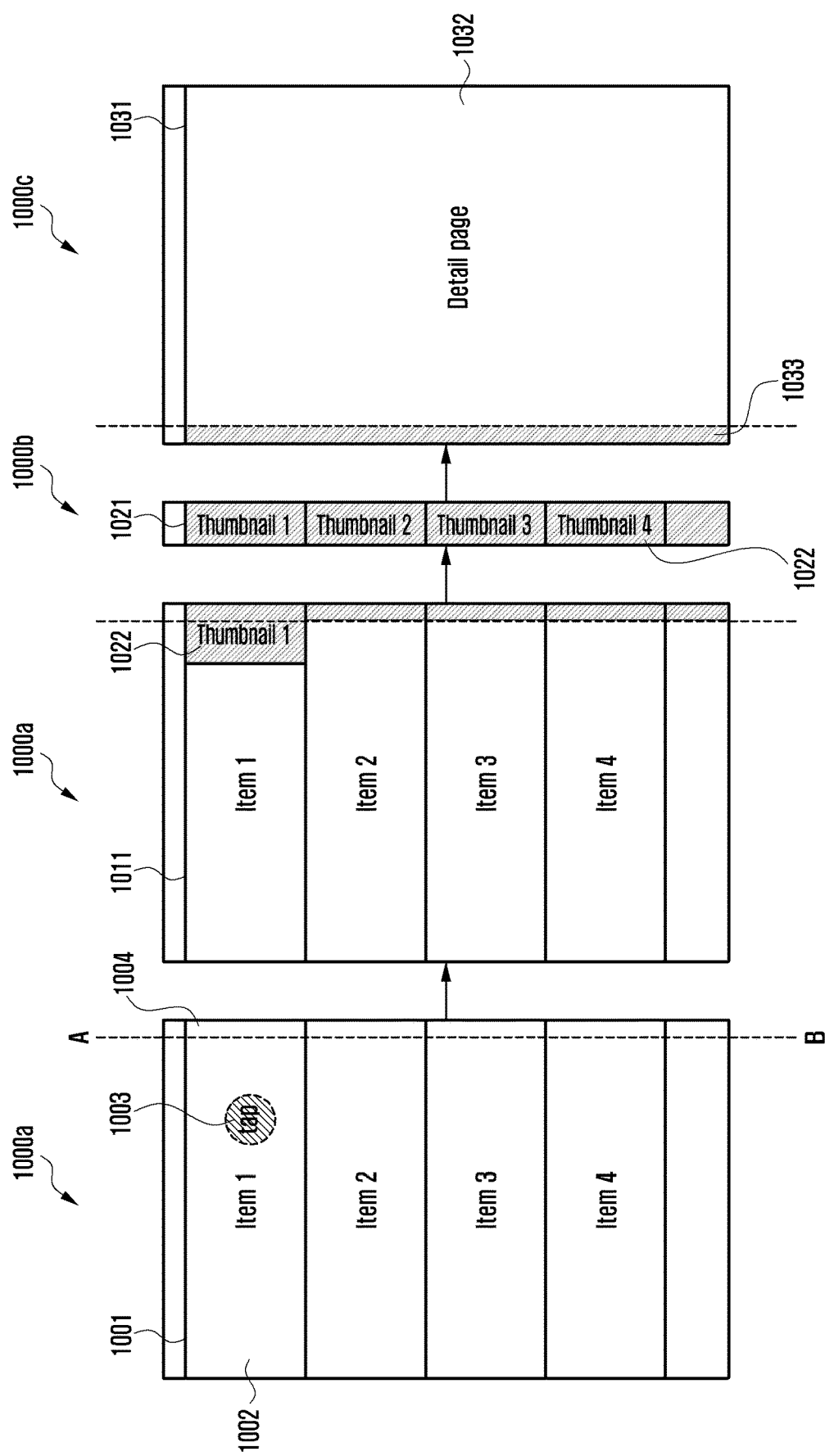
FIG. 10 is a diagram illustrating an example of displaying, on a back display region, detailed information corresponding to an item selected on a front display region.

FIG. 10 is a diagram illustrating an example of displaying, on a back display region, detailed information corresponding to an item selected on a front display region.

Referring to FIG. 10, a front face 1000a of the electronic device, a side face 1000b of the electronic device, and a back face 1000c of the electronic device are shown. On the front face 1000a of the electronic device, the front display region 1001 and a part 1004 of the side display region 1021 may be exposed. The front display region 1001 may display a list of a plurality of items. If the user selects one item 1003 of the items, a thumbnail image 1022 corresponding to the selected item 1002 appears on the front display region 1001, slides rightward, and is displayed on the side display region 1021. The height of the thumbnail image 1022 may be equal to that of the item 1001, and the width of the thumbnail image 1022 may be equal to that of the side display region 1021. The thumbnail image 1022 may be displayed on the side display region 1021, and the detailed information 1032 of the selected item 1002 may be displayed on the back display region 1031.

The back display region 1031 and a part 1033 of the side display region 1021 may be exposed on the back face 1000c of the electronic device. If the user inverts the electronic device when an item 1002 is selected, the detailed information 1032 of the selected item 1002 may be displayed on the back display region 1031. Since the user can see the thumbnail image 1022 of the selected item 1002 through the partially exposed side display region 1031 at the back face 1000c of the electronic device, the user may recognize which item corresponds to the detailed information 1032 displayed on the back display region 1031.

For example, if the user selects a first album when a list of several music albums is displayed on the front display region 1001, an image of the first album is displayed on the side display region, and a list of all songs in the first album and detailed information about the first album may be displayed on the back display region.

In another example, if the user selects a first commodity when a list of commodities is displayed on the front display region 1001, a thumbnail image of the first commodity is displayed on the side display region 1021, and the price, origin and related whole image of the first commodity may be displayed on the back display region 1031.

In still another example, if the user selects a first e-book when a list of e-books is displayed on the front display region 1001, an image of the first e-book is displayed on the side display region 1021, and the table of contents and summary information of the first e-book may be displayed on the back display region 1031.

Figure 11:
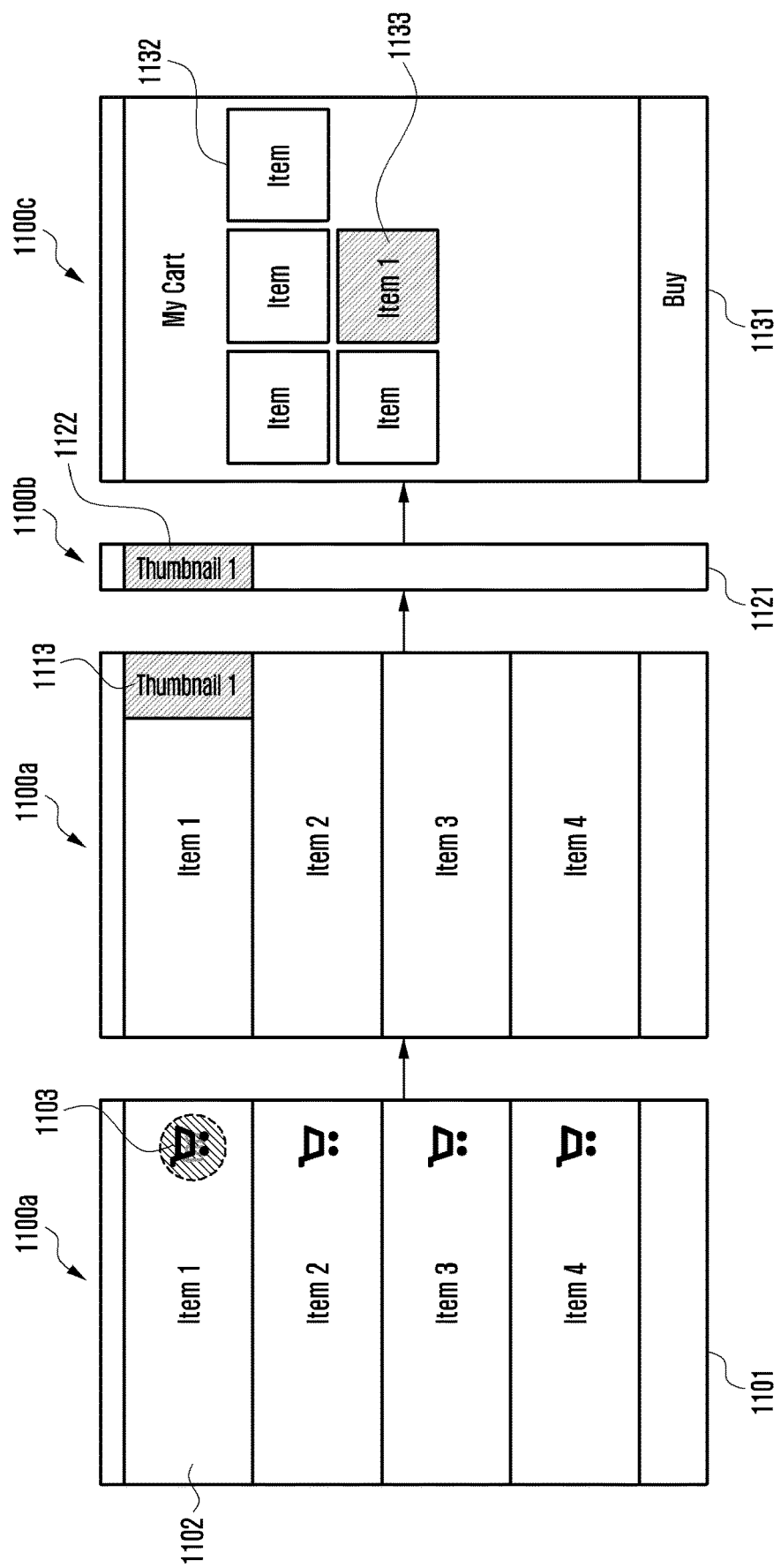
FIG. 11 is a diagram illustrating an example of web shopping in an electronic device according to various embodiments of the present disclosure.

FIG. 11 is a diagram illustrating an example of web shopping in an electronic device according to various embodiments of the present disclosure.

Referring to FIG. 11, the front face 1100a of the electronic device, the side face 1100b of the electronic device, and the back face 1100c of the electronic device are shown. On the front face 1100*a* of the electronic device, the front display region 1101 and a part of the side display region 1121 may be exposed. The front display region 1101 may display a list of a plurality of items, e.g., a list of commodities. In each item, a simple commodity image, a brand name, and a shopping basket icon may be displayed. If the user selects one item 1102 in the list, the selected item may be put in the shopping list. This process of selecting the item 1102 may be performed through a touch action 1103 on the shopping basket icon. When the user touches the shopping basket icon, the thumbnail image 1122 corresponding to the selected item appears on the front display region 1101, slides rightward, and is displayed on both a left part 1113 of the front display region and the side display region 1121. The height of the thumbnail image may be equal to that of the item, and the width of the thumbnail image may be equal to that of the side display region. The thumbnail image 1122 may be displayed on the side display region 1121, and the information 1133 of the selected item may be displayed on the back display region 1131.

The back display region 1131 and a part of the side display region 1121 may be exposed on the back face 1100*c* of the electronic device. If the user inverts the electronic device when one item is selected, the information 1133 about the selected item and the information 1132 about the previously selected item may be displayed on the back display region 1131. Also, the user may see the thumbnail image 1122 of the selected item through the partially exposed side display region 1121 at the back face 1100*c* of the electronic device.

Figure 12:
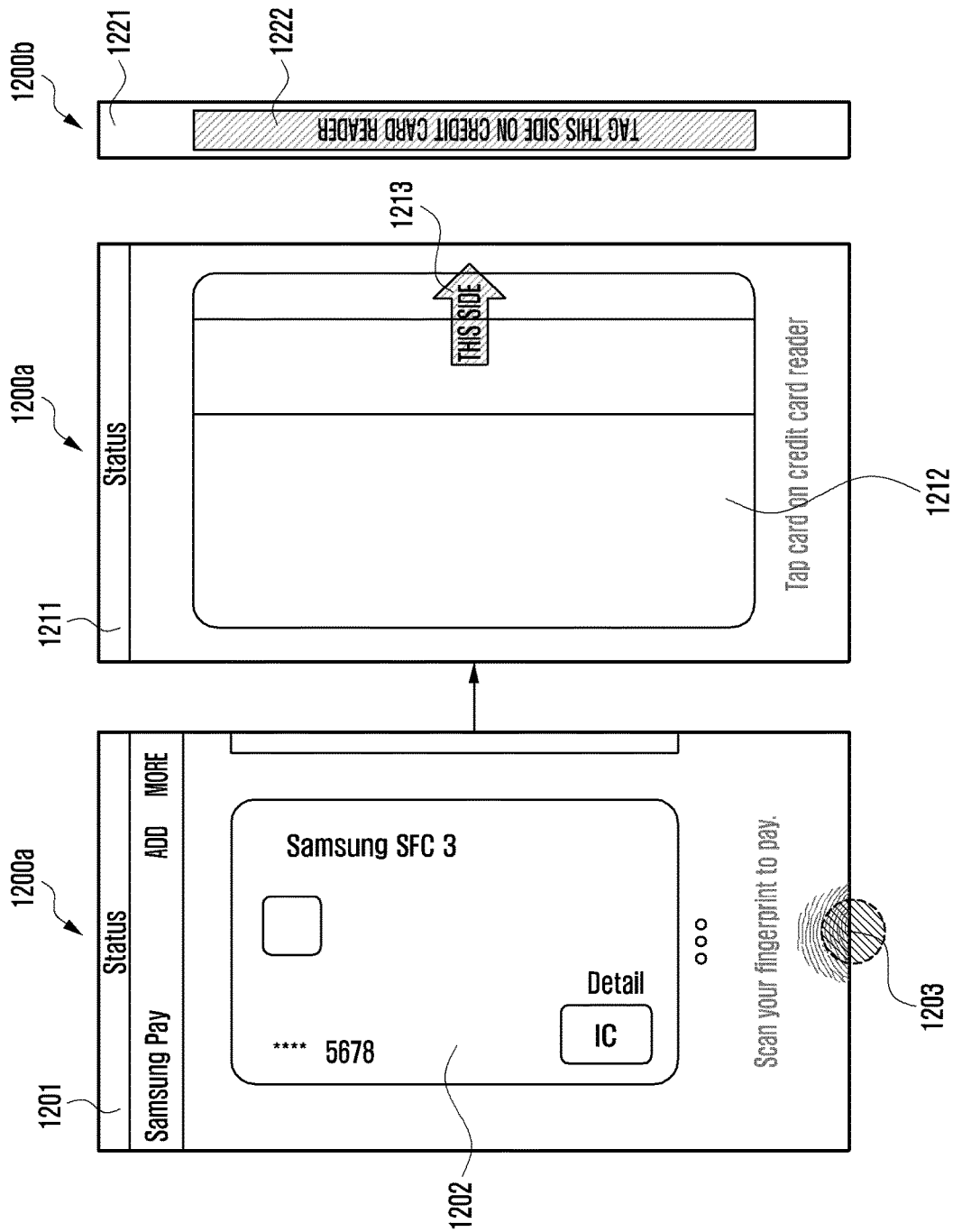
FIG. 12 is a diagram illustrating an example of a payment transaction in an electronic device according to various embodiments of the present disclosure.

FIG. 12 is a diagram illustrating an example of a payment transaction in an electronic device according to various embodiments of the present disclosure.

In a typical electronic device, an MST coil is disposed on the back face of the electronic device, and the display is disposed on the front face of the electronic device. On the display, a card image inducing the user to pay with a credit card may be displayed. Since the MST coil and the card image are displayed on different regions, the user has no choice but to perceive the card image on the display and then put the display region into contact with a card reader. Unfortunately, this often causes a failure in card payment.

According to various embodiments of this disclosure, the electronic device can display a message inducing the user to pay with a credit card on a region where the MST coil is disposed, and thus offer an intuitive UI to the user.

Referring to FIG. 12, the front face 1200*a* and side face 1200*b* of the electronic device are shown. The front display region 1201 of the display may be exposed on the front face 1200*a* of the electronic device. The side display region 1221 of the display may be exposed on the side face 1200*b* of the electronic device. An MST coil may be equipped on the side face 1200*b* of the electronic device. Namely, the display region for displaying a message or graphic image inducing a card payment may be identical with the face of the electronic device on which the MST coil is equipped. For example, if the MST coil is equipped on the front face 1200*a* of the electronic device, a message or graphic image inducing a card payment may be displayed on the front display region 1201. Also, if the MST coil is equipped on the side face 1200*b* of the electronic device, a message or graphic image inducing a card payment may be displayed on the side display region 1221. Similarly, if the MST coil is equipped on the back face of the electronic device, a message or graphic image inducing a card payment may be displayed on the back display region.

A front face 1202 of a credit card may be displayed on the front display region 1201. When the electronic device enters a card payment mode, the front display region 1201 may display the front face 1202 of a credit card and a UI element 1203 for receiving a user input for payment authorization, e.g., a fingerprint input. The UI element 1203 may be, e.g., a fingerprint image. If the user inputs his or her fingerprint when the front image 1202 of a credit card is displayed on the front display region 1201, a back face image 1212 of the credit card may be displayed on the front display region 1201. Also, a graphic object 1213 indicating the direction of a magnetic stripe may be displayed. Meanwhile, a message 1222 inducing a card payment may be displayed on the side display region 1221.

Since the MST coil is disposed on the side face of the electronic device, the user may carry the side face of the electronic device near a card reader and perform the card payment.

Figure 13:
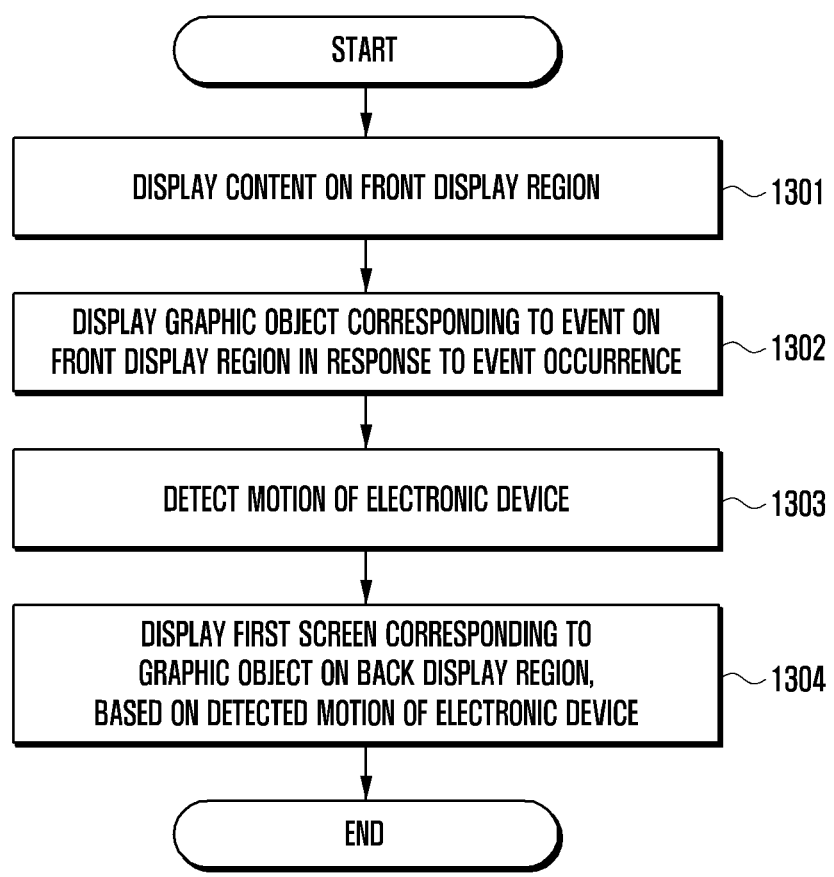
FIG. 13 is a flow diagram illustrating a process of displaying specific content corresponding to an event on a back display region in response to the occurrence of the event in an electronic device according to various embodiments of the present disclosure.

FIG. 13 is a flow diagram illustrating a process of displaying specific content corresponding to an event on a back display region in response to the occurrence of the event in an electronic device according to various embodiments of the present disclosure.

Referring to FIG. 13, the electronic device may display content on the front display region (step 1301). At this time, the back display region may be turned off. If any event occurs when certain content is displayed on the front display region, the electronic device may display a graphic object corresponding to the event on the front display region (step 1302). This event may be, for example, a notification. The graphic object may be an image of a notification-creating subject, e.g., a message sender's face image. Also, the graphic object may be a telephone icon. And also, the graphic object may be a letter, pattern or symbol that represents the type of information.

The graphic object may be displayed on the content in an overlay form. In addition, the graphic object may be displayed on the front display region as if it gradually appears to the front display region.

If the user inverts the electronic device, the electronic device may detect the motion thereof through the sensor module (step 1303). Specifically, the processor may detect the inversion of the electronic device through the sensor module and then, based on the detected motion of the electronic device, display a first screen corresponding to the graphic object on the back display region (step 1304). The first screen corresponding to the graphic object may be a detailed screen corresponding to the graphic object. For example, if the graphic object is a message sender's face image, the first screen may be a message chat window. If the graphic object is an alarm indication, the first screen may be a calendar.

The electronic device may display a second screen corresponding to the graphic object on the side display region. On the second screen, a part of content displayed on the first screen may be displayed. Also, the second screen may contain part of information of the content displayed on the first screen. For example, if the first screen is a message chat window, the second screen may be a part of the chat window. On the second screen, a message sender's face image and a recent chat phrase may be displayed. The second screen displayed on the side display region may appear when an event occurs in the electronic device. Also, the second screen displayed on the side display region may appear based on the motion of the electronic device. If the electronic device is inverted in a state where a notification event occurs in the electronic device, the processor detect may detect the motion of the electronic device through the sensor module and then, based on a signal outputted from the sensor module, display the second screen on the side display region. Specifically, based on a signal outputted from the acceleration sensor, the electronic device may gradually display the first screen on the back display region. When the first screen is displayed on the back display region, the electronic device may give an animation effect. For example, the first screen may be displayed on the back display region as if it gradually spreads from an upper part of the back display region to a lower part. The spreading speed of the first screen may vary depending on a tilted angle of the electronic device. Specifically, the processor may determine the spreading speed of the first screen, based on a signal outputted from the acceleration sensor included in the sensor module. Also, the processor may determine the displaying speed of the first screen, based on a signal outputted from the acceleration sensor included in the sensor module.

The electronic device may display an icon for executing an application on the side display region. In this state, the electronic device may receive a user input of touching the icon on the side display region and then, based on the user input, display an execution screen of the application on the front display region or the back display region.

The electronic device may receive a user input of dragging an icon leftward on the side display region and then display an execution screen of a corresponding application on the front display region. Similarly, the electronic device may receive a user input of dragging an icon rightward on the side display region and then display an execution screen of a corresponding application on the back display region.

The electronic device may detect a user input on the side display region when a list is displayed on the front display region. For example, the electronic device may detect a tap gesture on the side display region. If any user input is detected on the side display region, the electronic device may display an item, corresponding to a location of the detected user input, to be visually distinguished. For example, the electronic device may highlight the item corresponding to the location of the detected user input.

When one item is selected in a list displayed on the front display region, the electronic device may detect a drag gesture on the side display region and then drag the selected item in response to the drag gesture.

Also, the electronic device may display a list on the front display region, detect a user input of selecting one item in the list, and display a thumbnail image of the selected item on the side display region in response to the user input. And also, the electronic device may display a detailed screen corresponding to the selected item on the back display region.

At least part of the method (e.g., operations) or system (e.g., modules or functions) according to various embodiments can be implemented with instructions as programming modules that are stored in computer-readable storage media. One or more processors (e.g., processor 120) can execute instructions, thereby performing the functions. An example of the computer-readable storage media may be a memory 130. At least part of the programming modules can be implemented (executed) by a processor. At least part of the programming module may include modules, programs, routines, sets of instructions or processes, etc., in order to perform one or more functions.

Examples of computer-readable media include: magnetic media, such as hard disks, floppy disks, and magnetic tape; optical media such as Compact Disc Read Only Memory (CD-ROM) disks and Digital Versatile Disc (DVD); magneto-optical media, such as floptical disks; and hardware devices that are specially configured to store and perform program instructions (e.g., programming modules), such as read-only memory (ROM), random access memory (RAM), flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to various embodiments may include one or more components, remove part of them described above, or include new components. The operations performed by modules, programming modules, or the other components, according to various embodiments, may be executed in serial, parallel, repetitive or heuristic fashion. Part of the operations can be executed in any other order, skipped, or executed with additional operations. The embodiments described in the present disclosure are merely provided to assist in a comprehensive understanding of the disclosure and the technology thereof and are not suggestive of limitation. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a bended display including a front display region, a side display region, and a back display region, which respectively correspond to a front face, a side face, and a back face of the electronic device;
a sensor configured to detect an amount of a motion of the electronic device; and
a processor configured to:
control the bended display to display a received notification,
based on the notification being received while content is displayed on the front display region, control the bended display to display a graphic object corresponding to the notification received on the front display region;
based on the sensor detecting the amount of the motion of the electronic device reaching a first amount, control the bended display to display an animation related to the graphic object corresponding to the notification received from the front display region, wherein the graphic object is animated and moved from the front display region to the side display region while maintaining the content displayed on the front display region; and
based on the sensor detecting the amount of the motion of the electronic device reaching a second amount, control the bended display to continue the animation related to the graphic object corresponding to the notification received from the front display region by moving the graphical object from the side display region to a first screen on the back display region while maintaining the content displayed on the front display region;

wherein:
the second amount of the motion of the electronic device is greater than the first amount of the motion of the electronic device,
and
the first screen comprises information related to the notification received.

2. The electronic device of claim 1, wherein the processor is further configured to control the bended display to display a second screen corresponding to the graphic object on the side display region.

3. The electronic device of claim 2, wherein part of the content displayed on the first screen is displayed on the second screen.

4. The electronic device of claim 1, wherein the sensor includes an acceleration sensor, and
wherein the processor is further configured to control the bended display to gradually display the first screen on the back display region, based on a signal outputted from the acceleration sensor.

5. The electronic device of claim 1, wherein the processor is further configured to control the bended display to display an icon for executing an application on the side display region, to receive a user input on the side display region, and to control the bended display to display an execution screen of the application on the front display region or on the back display region.

6. The electronic device of claim 5, wherein the processor is further configured to control the bended display to display the execution screen of the application on the front display region based on the user input being a leftward drag of the icon.

7. The electronic device of claim 5, wherein the processor is further configured to control the bended display to display the execution screen of the application on the back display region based on the user input being a rightward drag of the icon.

8. The electronic device of claim 1, wherein the processor is further configured to, based on a tap gesture being detected on the side display region as a list is displayed on the front display region, select an item corresponding to a location of the detected tap gesture, and to control the bended display to display the selected item to be visually distinguished.

9. The electronic device of claim 8, wherein the processor is further configured to control the bended display to drag the selected item in response to a drag gesture being detected on the side display region.

10. The electronic device of claim 1, wherein the processor is further configured to receive a user input of selecting one item in a list in response to the list being displayed on the front display region, to control the bended display to display a thumbnail image of the selected item on the side display region, and to control the bended display to display a detailed screen corresponding to the selected item on the back display region.

11. A display method of an electronic device which includes a bended display including a front display region, a side display region, and a back display region, which respectively correspond to a front face, a side face, and a back face of the electronic device, the method comprising steps of:
displaying a received notification;
displaying content on the front display region;
based on the notification being received while the content is displayed on the front display region, displaying a graphic object corresponding to the notification received on the front display region while maintaining the content displayed on the front display region;
detecting an amount of a motion of the electronic device through a sensor;
based on the sensor detecting the amount of the motion of the electronic device reaching a first amount, displaying an animation related to the graphic object corresponding to the notification received from the front display region, wherein the graphic object is animated and moved from the front display region to the side display region while maintaining the content displayed on the front display region; and
based on the sensor detecting the amount of the motion of the electronic device reaching a second amount, controlling the bended display to continue the animation related to the graphic object corresponding to the notification received from the front display region by moving the graphical object from the side display region to a first screen on the back display region while maintaining the content displayed on the front display region;
wherein:
the second amount of the motion of the electronic device is greater than the first amount of the motion of the electronic device,
and
the first screen comprises information related to the notification received.

12. The method of claim 11, further comprising:
displaying a second screen corresponding to the graphic object on the side display region.

13. The method of claim 12, wherein part of the content displayed on the first screen is displayed on the second screen.

14. The method of claim 11, further comprising:
gradually displaying the first screen on the back display region, based on a signal outputted from an acceleration sensor of the sensor.

15. The method of claim 11, further comprising:
displaying an icon for executing an application on the side display region;
receiving a user input on the side display region; and
displaying an execution screen of the application on the front display region or on the back display region.

16. The method of claim 15, wherein displaying the execution screen of the application includes displaying the execution screen of the application on the front display region based on the user input being a leftward drag of the icon.

17. The method of claim 15, wherein displaying the execution screen of the application includes displaying the execution screen of the application on the back display region based on the user input being a rightward drag of the icon.

18. The method of claim 11, further comprising:
detecting a tap gesture on the side display region in response to a list being displayed on the front display region;
selecting an item corresponding to a location of the detected tap gesture; and
displaying the selected item to be visually distinguished.

19. The method of claim 18, further comprising:
detecting a drag gesture on the side display region; and
dragging the selected item in response to the detected drag gesture.

20. The method of claim 11, further comprising:
displaying a list on the front display region;
receiving a user input of selecting one item in the list in response to the list being displayed;
displaying a thumbnail image of the selected item on the side display region in response to the user input; and
displaying a detailed screen corresponding to the selected item on the back display region.

\* \* \* \* \*